(12) United States Patent
Munz et al.

(10) Patent No.: US 11,265,805 B2
(45) Date of Patent: Mar. 1, 2022

(54) TECHNIQUE FOR TIME-SENSITIVE NETWORKING OVER A RADIO ACCESS NETWORK

(71) Applicant: Telefonaktiebolaget LM Ericsson (publ), Stockholm (SE)

(72) Inventors: Hubertus Munz, Aachen (DE); Torsten Dudda, Aachen (DE); Dhruvin Patel, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 605 days.

(21) Appl. No.: 16/096,915

(22) PCT Filed: Aug. 31, 2018

(86) PCT No.: PCT/EP2018/073515
§ 371 (c)(1),
(2) Date: Oct. 26, 2018

(87) PCT Pub. No.: WO2020/043315
PCT Pub. Date: Mar. 5, 2020

(65) Prior Publication Data
US 2021/0227452 A1    Jul. 22, 2021

(51) Int. Cl.
*H04W 48/12* (2009.01)
*H04W 76/10* (2018.01)
*H04L 12/24* (2006.01)
*H04L 41/0806* (2022.01)

(52) U.S. Cl.
CPC ......... *H04W 48/12* (2013.01); *H04L 41/0806* (2013.01); *H04W 76/10* (2018.02)

(58) Field of Classification Search
CPC .... H04W 48/12; H04W 76/10; H04L 41/0806
See application file for complete search history.

(56) References Cited

U.S. PATENT DOCUMENTS

2018/0063020 A1    3/2018    Bhagavatula et al.
2019/0335379 A1*  10/2019   Joseph .................. H04W 28/06

FOREIGN PATENT DOCUMENTS

EP    2670206 A1    12/2013

OTHER PUBLICATIONS

IEEE, Draft Standard for Local and metropolitan area networks—Bridges and Bridged Networks; Amendment: Stream Reservation Protocol (SRP) Enhancements and Performance Improvements; Time-Sensitive Networking Task Group of IEEE 802.1 of the LAN/MAN Standards Committee of the IEEE Compoter Society, IEEE P802.1Qcc/D2.3, May 3, 2018, 214 pages.

(Continued)

*Primary Examiner* — Diane D Mizrahi
(74) *Attorney, Agent, or Firm* — Sage Patent Group

(57) ABSTRACT

A technique for Time-Sensitive Networking, TSN, over a radio access network, RAN, is described. As to a handling method aspect of the technique, system information is received from a radio base station of the RAN. The system information is implicative or indicative of support for TSN through the radio base station. Depending on the received system information, at least one TSN stream of the TSN through the radio base station is established or initiated to establish.

22 Claims, 13 Drawing Sheets

(56) References Cited

OTHER PUBLICATIONS

International Search Report and Written Opinion of the International Searching Authority, PCT/EP2018/073515, dated May 21, 2019, 15 pages.
ETSI, ETSI GS NGP 008 v 0.0.3 (Jun. 2018), "Next Generation Protocols (NGP); Mobile Deterministic Networking," 22 pages.
Raagaard, Michael Lander et al., "Runtime Reconfiguration of Time-Sensitive Networking (TSN) Schedules for Fog Computing," 2017 IEEE Fog World Congress (FWC), Oct. 30, 2017, 6 pages.
3GPP, 3GPPTS 23.501 v 15.1.0 (Mar. 2018), 3rd Generation Partnership Project; Technical Specification Group Services and Systems Aspects; System Architecture for the 5G System; Stage 2 (Release 15), 201 pages.

* cited by examiner

TECHNIQUE FOR TIME-SENSITIVE NETWORKING OVER A RADIO ACCESS NETWORK

CROSS REFERENCE TO RELATED APPLICATIONS

This application is a 35 U.S.C. § 371 national stage application of PCT International Application No. PCT/EP2018/073515 filed on Aug. 31, 2018, the disclosure and content of which is incorporated by reference herein in its entirety.

TECHNICAL FIELD

The present disclosure generally relates to a technique for Time-Sensitive Networking (TSN) over a radio access network (RAN). More specifically, methods and devices are provided for handling TSN over a RAN, announcing TSN over a RAN, and distributing a configuration message for TSN over a RAN.

BACKGROUND

Factory automation, i.e., automation in a manufacturing plant (or briefly: factory), requires networking with high reliability and low latency. The concept of "Industry 4.0" is an example for factory automation. Candidate technologies for such networking include conventional Time Sensitive Networking (TSN) as standardized by the IEEE 802.1 TSN Task Group and the fifth generation (5G) mobile communications technology currently standardized by the Third Generation Partnership Project (3GPP). For example, the 3GPP document RP-181479 has initiated a study item for upcoming 3GPP Release 16 to support TSN for factory automation.

The conventional TSN technology is based on the IEEE 802.3 Ethernet standard, which is an example of wired communication. Legacy Ethernet is designed for best-effort communication, and the conventional TSN technology adds a collection of features to achieve deterministic networking over Ethernet. In contrast, 5G mobile communications technology involves wireless radio communication using Long Term Evolution (LTE) and/or New Radio (NR) according to the 3GPP.

At least some units of factory automation, such as autonomous, multifunctional, and/or mobile machinery and robots, require networking by means of wireless radio communication. However, a factory unit acting as a mobile terminal of the RAN, e.g., a 3GPP user equipment (UE), would have to establish a radio connection with a radio base station of the RAN just to find out that this particular radio base station does not support TSN.

SUMMARY

Accordingly, there is a need for a technique that enables TSN over wireless radio communication. An alternative or more specific object is to enable a mobile terminal to specifically select a radio base station that supports TSN, preferably prior to establishing a radio connection between the mobile terminal and the radio base station.

As to a first aspect, a method of handling Time-Sensitive Networking (TSN) over a radio access network (RAN) is provided. The method comprises a step of receiving system information (SI) from a radio base station (RBS) of the RAN. The SI is implicative or indicative of support for TSN through the RBS. The method further comprises a step of establishing or initiating to establish, depending on the received SI, at least one TSN stream of the TSN through the RBS.

In at least some embodiments, energy (e.g., driving a power amplifier or radio transmission), time (e.g., a delay caused by the wireless radio communication), and/or radio resources (e.g., transmission time intervals, subcarriers or spatial streams) can be used more efficiently in the RAN, e.g., by one or more mobile terminals of the RAN and/or the RBS of the RAN. At least some embodiments can avoid an unnecessary random access (RA) procedure, an unnecessary radio resource control (RRC) connection, and/or an unnecessary initial attach (IA) procedure, or any other procedure to access or connect with the RAN or register to a core network (CN). The IA procedure may comprise a default bearer setup. Same or further embodiments can enable the mobile terminal to establish a TSN stream quicker or with less delay. The RAN and the CN are collectively referred to as the network.

By means of the SI, embodiments of the technique can enable the mobile terminal to determine if TSN and/or which TSN features are supported by the network (e.g., through the RBS) before being attached to network. Optionally, TSN information may be broadcasted by the RBS, e.g., in the SI. Preferably, the mobile terminal (e.g., only) conditionally establishes a connection to the RAN (e.g., to the RBS), if the SI (e.g., the TSN information) indicates that the RAN (e.g., that the RBS) fulfills TSN requirements of the mobile terminal (e.g., TSN requirements of a TSN application of the mobile terminal or TSN requirements of a TSN application using the mobile terminal for TSN).

The received SI may imply that TSN is not supported through the RBS. For example, receiving SI that is silent on TSN (e.g., silent on any TSN feature and/or any TSN configuration) may imply that the TSN is not supported through the RBS. If the received SI indicates (i.e., is indicative) or implies (i.e., is implicative) that the RBS does not support TSN, a mobile terminal may refrain from initiating to establish a TSN stream through the RBS (i.e., no TSN stream is established using the particular RBS) based on the received SI.

If the SI received from two or more RBSs indicates (i.e., is indicative) or implies (i.e., is implicative) that the respective RBS supports TSN, the mobile terminal may select one of the two or more RBSs based on the received SIs.

The method may be performed by a user equipment (UE). Herein, the expression "UE" may encompass any mobile terminal configured for performing a random access procedure with the RBS or any other RBS of the RAN and/or configured for establishing a radio connection with the RBS or any other RBS of the RAN.

The UE may be a 3GPP UE, a mobile or portable station (STA, e.g. a Wi-Fi STA), a device for machine-type communication (MTC), a device for the Internet of Things (IoT) or a combination thereof. Examples for the UE include robots, sensors and/or actuators, e.g., in manufacturing, automotive communication and home automation. The MTC device or the IoT device may be implemented in household appliances and consumer electronics. Examples for the combination include a self-driving vehicle.

Furthermore, the UE may be a talker and/or a listener of the TSN and/or the at least one TSN stream.

As to a second aspect, a method of announcing Time-Sensitive Networking (TSN) over a radio access network (RAN) is provided. The method comprises a step of transmitting system information (SI) from a radio base station (RBS) of the RAN. The SI is implicative or indicative of support for TSN through the RBS. The method further comprises a step of supporting, according to the transmitted SI, at least one TSN stream of the TSN through the RBS.

The RBS may perform the method. The SI may be transmitted to a UE, The at least one TSN stream may be terminated at the UE.

The technique may be implemented at the RAN. The RBS may serve a cell of the RAN. The RBS may encompass any station that is configured to provide radio access to the UE. The RBS may serve a plurality of UEs. The second aspect of the technique may be implemented once at the RBS with respect to each of the served UEs. The first aspect of the technique may be implemented at each of the served UEs.

The second method aspect may cooperate with and/or trigger the first method aspect.

As to a third aspect, a method of distributing a configuration message for Time-Sensitive Networking (TSN) over a radio access network (RAN) is provided. The method comprises a step of determining at least one configuration message indicative of support for the TSN through at least one radio base station (RBS) of the RAN. The method further comprises a step of sending the configuration message from a core network (CN) to each of the at least one RBS of the RAN.

The configuration message may trigger each RBS that receives the configuration message to send the SI and/or support the at least one TSN stream. For example, reception of the configuration message indicative of support for the TSN may trigger sending SI that is indicative or implicative of support for the TSN. The CN may be connected to the RAN.

The method may be performed by the CN, e.g., by an Access and Mobility Management Function or, briefly, Access Management Function (AMF). Alternatively or in addition, the method may be performed by a TSN network, e.g., a centralized user configuration (CUC) or a centralized network configuration (CNC).

The third method aspect may cooperate with and/or trigger the second method aspect.

In any aspect, the RBS may be a distributed base station or a component of a cloud-RAN (C-RAN). The RBS may be implemented by at least one of a baseband unit (BBU) and one or more radio function units (RFU, e.g., remote radio heads or RRH) connected to the BBU. The at least one TSN stream may be established through the RFU from which the SI has been received or through another RFU of the RAN.

Examples for the RBS may include a 2G base station or Base Transceiver Station (BTS), a 3G base station or Node B (NB), 4G base station or eNodeB (eNB), a 5G base station or gNodeB (gNB), and an access point (e.g., a Wi-Fi access point or AP). The RAN may be implemented according to the Global System for Mobile Communications (GSM), the Universal Mobile Telecommunications System (UMTS), Long Term Evolution (LTE), New Radio (NR), and/or IEEE 802.11 or Wi-Fi. The CN may a 5G core network according to 3GPP.

The technique may be implemented on a Physical Layer (PHY), a Medium Access Control (MAC) layer, a Radio Link Control (RLC) layer, a Radio Resource Control (RRC) layer of a protocol stack for the radio communication, an S1 application protocol (S1-AP), a reference point NG2 and/or a non-access stratum (NAS).

The TSN may be based on or may comprise any feature for ultra-reliable and/or low-latency communications (URLLC), e.g., transmission time interval (TTI) structures for low latency and/or methods for improved reliability defined for 3GPP NR in Release 15 or 16.

The technique may implement TSN for radio transmissions and/or a radio network, e.g., for a 5G cellular RAN or NR access network. Herein, networking may encompass bilateral or multilateral communication between nodes of a network, e.g., the UEs. Use cases of the technique may include factory automation, i.e., the technique may implement factory automation networking. Use cases may include (e.g., pure) plant measurements, e.g., for precise motion control in a robotized factory cell.

The technique may enable a wireless networking that fulfills the requirements of networking for factory automation, e.g. manufacturing according to the concept of "Industry 4.0". Herein, factory automation, particularly the concept of "Industry 4.0", may comprise at least one of cyber-physical systems, the Internet of Things (IoT), cloud computing and cognitive computing.

As to another aspect, a computer program product is provided. The computer program product comprises program code portions for performing any of the steps of the first method aspect, the second method aspect and/or the third method aspect disclosed herein when the computer program product is executed by one or more computing devices. The computer program product may be stored on a computer-readable recording medium. The computer program product may also be provided for download via a data network, e.g., over the RAN, via the Internet, and/or through the RBS. Alternatively or in addition, the method may be encoded in a Field-Programmable Gate Array (FPGA) and/or an Application-Specific Integrated Circuit (ASIC), or the functionality may be provided for download by means of a hardware description language.

As to a first device aspect, a device for handling Time-Sensitive Networking (TSN) over a radio access network (RAN) is provided. The device is configured to perform the first method aspect. Alternatively or in addition, the device comprises a receiving unit configured to receive system information (SI) from a radio base station (RBS) of the RAN. The SI is implicative or indicative of support for TSN through the RBS. The device further comprises an establishing unit configured to establish or initiate to establish, depending on the received SI, at least one TSN stream of the TSN through the RBS.

As to a further first device aspect, a device for handling Time-Sensitive Networking (TSN) over a radio access network (RAN) is provided. The device comprises at least one processor and a memory. Said memory comprises instructions executable by said at least one processor whereby the device is operative to perform the first method aspect. Alternatively or in addition, execution of the instructions causes the device to be operative to receive system information (SI) from a radio base station (RBS) of the RAN. The SI is implicative or indicative of support for TSN through the RBS. Execution of the instructions further causes the device to be operative to establish or initiate establishing, depending on the received system information, at least one TSN stream of the TSN through the RBS.

As to a still further first device aspect, a device for handling Time-Sensitive Networking (TSN) over a radio access network (RAN) is provided. The device comprises one or more modules for performing the first method aspect. Alternatively or in addition, the device comprises a system information (SI) reception module for receiving SI from a radio base station (RBS) of the RAN. The SI is implicative or indicative of support for TSN through the RBS. The device further comprises a TSN stream module for establishing or initiating to establish, depending on the received system information, at least one TSN stream of the TSN through the RBS.

As to a second device aspect, a device for announcing Time-Sensitive Networking (TSN) over a radio access network (RAN) is provided. The device is configured to perform the second method aspect. Alternatively or in addition, the device comprises a transmitting unit configured to transmit system information (SI) from a radio base station (RBS) of the RAN. The SI is implicative or indicative of support for TSN through the RBS. The device further comprises a supporting unit configured to support, according to the transmitted SI, at least one TSN stream of the TSN through the RBS.

As to a further second device aspect, a device for announcing Time-Sensitive Networking (TSN) over a radio access network (RAN) is provided. The device comprises at least one processor and a memory. Said memory comprises instructions executable by said at least one processor whereby the device is operative to perform the second method aspect. Alternatively or in addition, execution of the instructions causes the device to be operative to transmit system information (SI) from a radio base station (RBS) of the RAN. The SI is implicative or indicative of support for TSN through the RBS. Execution of the instructions further causes the device to be operative to support, according to the transmitted SI, at least one TSN stream of the TSN through the RBS.

As to a still further second device aspect, a device for announcing Time-Sensitive Networking (TSN) over a radio access network (RAN) is provided. The device comprises one or more modules for performing the second method aspect. Alternatively or in addition, the device comprises a system information (SI) transmission module for transmitting SI from a radio base station (RBS) of the RAN, wherein the SI is implicative or indicative of support for TSN through the RBS. The device further comprises a TSN stream module for supporting, according to the transmitted SI, at least one TSN stream of the TSN through the RBS.

As to a third device aspect, a device for distributing a configuration message for Time-Sensitive Networking (TSN) over a radio access network (RAN) is provided. The device is configured to perform the third method aspect. Alternatively or in addition, the device comprises a determining unit configured to determine at least one configuration message indicative of support for the TSN through at least one radio base station of the RAN. The device further comprises a sending unit configured to send the configuration message from a core network (CN) to each of the at least one RBS of the RAN.

As to a further third device aspect, a device for distributing a configuration message for Time-Sensitive Networking (TSN) over a radio access network (RAN) is provided. The device comprises at least one processor and a memory. Said memory comprises instructions executable by said at least one processor whereby the device is operative to perform the third method aspect. Alternatively or in addition, execution of the instructions causes the device to be operative to determine at least one configuration message indicative of support for the TSN through at least one radio base station (RBS) of the RAN. Execution of the instructions further causes the device to be operative to send the configuration message from a core network (CN) to each of the at least one RBS of the RAN.

As to a still further third device aspect, a device for distributing a configuration message for Time-Sensitive Networking (TSN) over a radio access network (RAN) is provided. The device comprises one or more modules for performing the third method aspect. Alternatively or in addition, the device comprises a configuration determining module for determining at least one configuration message indicative of support for the TSN through at least one radio base station (RBS) of the RAN. The device further comprises a configuration sending module for sending the configuration message from a core network (CN) to each of the at least one RBS of the RAN.

As to a still further aspect, a user equipment (UE) configured to communicate with a radio base station (RBS) is provided. The UE comprises a radio interface and processing circuitry configured to execute any of the steps of the first method aspect.

As to a still further aspect, a radio base station (RBS) configured to communicate with a user equipment (UE) is provided. The RBS comprises a radio interface and processing circuitry configured to execute any of the steps of the second method aspect.

As to a still further aspect, an Access Management Function (AMF) configured to communicate with a user equipment (UE) and/or a radio base station (RBS) is provided. The AMF comprises an interface (e.g., an interface S1 and/or a next generation reference point NG2) and processing circuitry configured to execute any of the steps of the third method aspect.

As to a still further aspect, a communication system including a host computer is provided. The host computer may comprise a processing circuitry configured to provide user data. The host computer may further comprise a communication interface configured to forward user data to a CN and/or a RAN (e.g., a cellular network) for transmission to a user equipment (UE). The UE may comprise a radio interface and processing circuitry, the processing circuitry of the UE being configured to execute any of the steps of the first method aspect. Alternatively or in addition, the RAN may comprise a RBS comprising a radio interface and processing circuitry, the processing circuitry of the RBS being configured to execute any of the steps of the second method aspect. Alternatively or in addition, the CN may comprise an AMF comprising an interface and processing circuitry, the processing circuitry of the AMF being configured to execute any of the steps of the third method aspect.

The communication system may further comprise the UE. Alternatively or in addition, the communication system may further comprise the RBS configured to communicate with the UE. Alternatively or in addition, the communication system may further comprise the AMF configured to communicate with the RBS.

The processing circuitry of the host computer may be configured to execute a host application, thereby providing the user data. Alternatively or in addition, the processing circuitry of the UE may be configured to execute a client application associated with the host application.

As to a still further aspect, a method implemented in a UE is provided. The method may comprise any of the steps of the first method aspect.

As to a still further aspect, a method implemented in a RBS is provided. The method may comprise any of the steps of the second method aspect.

As to a still further aspect, a method implemented in an AMF is provided. The method may comprise any of the steps of the third method aspect.

Any of the devices (e.g., any UE, RBS, AMF and/or host computer for embodying the technique) or the communication system may further include any feature disclosed in the context of any of the method aspects, and vice versa.

Particularly, any one of the devices, units, and modules, or a dedicated unit or module of the respective device, may be configured to perform or trigger one or more of the steps of any one of the method aspects.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 5G New Radio (NR) implementation, it is readily apparent that the technique described herein may also be implemented in any other radio network, including 3GPP LTE or a successor thereof and Wireless Local Area Network (WLAN or Wi-Fi) according to the standard family IEEE 802.11.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
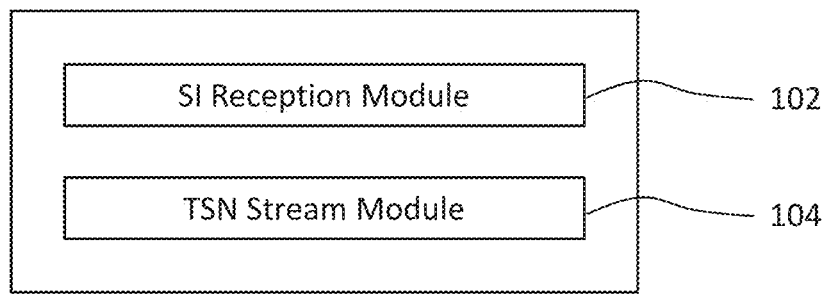
FIG. 1 shows a schematic block diagram for an embodiment of a device for handling Time-Sensitive Networking over a radio access network.

FIG. 1 schematically illustrates a block diagram for an embodiment of a device for handling Time-Sensitive Networking (TSN) over a radio access network (RAN). The device is generically referred to by reference sign 100.

The device 100 comprises a system information reception module 102 that receives system information (SI) from a radio base station (RBS) of the RAN. The SI is implicative or indicative of support (e.g., implicative or indicative as to the support) for TSN through the RBS, For example, the SI implies or indicates whether or not TSN is supported through the RBS. The device 100 further comprises a TSN stream module 104 that establishes or initiates establish, depending on the received SI, at least one TSN stream of the TSN through the RBS.

Figure 2:
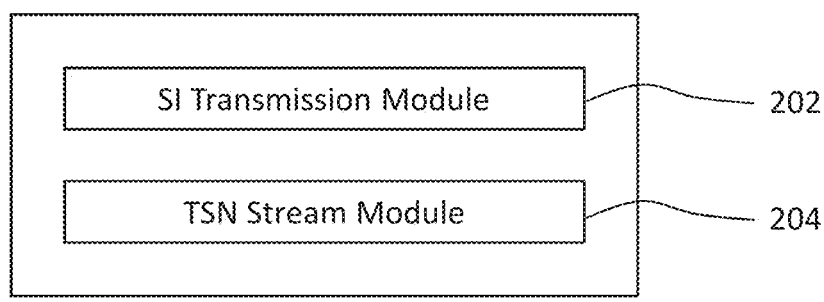
FIG. 2 shows a schematic block diagram for an embodiment of a device for announcing Time-Sensitive Networking over a radio access network.

FIG. 2 schematically illustrates a block diagram for an embodiment of a device for announcing TSN over a RAN. The device is generically referred to by reference sign 200.

The device 200 comprises a system information transmission module 202 that transmits (e.g., broadcasts) SI from a RBS of the RAN. The SI is implicative or indicative of support (e.g., implicative or indicative as to the support) for TSN through the RBS. The device 200 further comprises a TSN stream module 204 that supports, according to the transmitted SI, at least one TSN stream of the TSN through the RBS.

The device 200 may be connected to and/or part of the RAN. The device 200 may be embodied by or at the RBS of the RAN, nodes connected to the RBS or the RAN for controlling the RBS or a combination thereof.

The SI may be transmitted to an UE embodying the device 100. RBS from which the SI is received at the device 100 may be embodied by the device 200. The RAN referred to in the context of the device 100 may be the RAN referred to in the context of the device 200.

Figure 3:
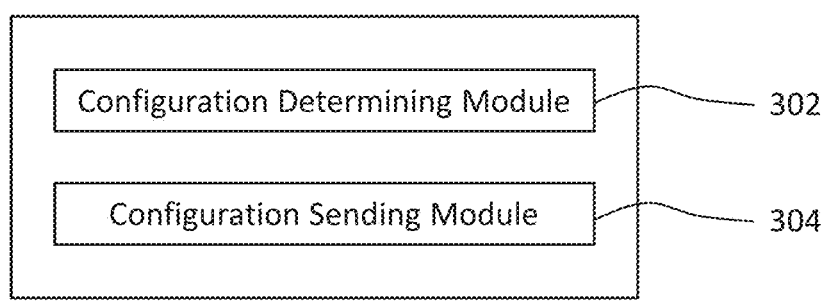
FIG. 3 shows a schematic block diagram for an embodiment of a device for distributing a configuration message for Time-Sensitive Networking over a RAN.

FIG. 3 schematically illustrates a block diagram for an embodiment of a device for distributing a configuration message for TSN over a RAN. The device is generically referred to by reference sign 300.

The device 300 comprises a configuration determining module 302 that determines at least one configuration message that is implicative or indicative of support (e.g., implicative or indicative as to the support) for the TSN through at least one RBS of the RAN. The device 300 further comprises a configuration sending module 304 that sends the at least one configuration message from a core network (CN) to each of the at least one RBS of the RAN.

The device 300 may be connected to and/or part of a CN serving the RAN and/or the at least one RBS. The device 300 may be embodied by or at an Access Management Function (AMF) or a Mobility Management Entity (MME) of the CN, nodes connected to the AMF, MME, or the CN for controlling the RBS, or a combination thereof.

Each of the at least one RBS may be an embodiment of the device 200. Each of the at least one RBS 200 may transmit its SI based on the configuration message received from the device 300.

Any of the modules of any of the devices 100, 200, and 300 may be implemented by units configured to provide the corresponding functionality.

In the context of any one of the device aspects, the device 100 may be a user equipment (UE, i.e., a mobile terminal or radio device) configured for a radio connection with the RBS. The UE 100 may be embodied by a TSN application, the UE 100 may comprise the TSN application, or the UE 100 may act as a networking interface for the TSN application. The TSN application may be a manufacturing robot or a self-driving vehicle.

The RBS embodying the device 200 may encompass a network controller (e.g., a Wi-Fi access point) or a radio access node (e.g. a 3G Node B, a 4G eNodeB, or a 5G gNodeB) of the RAN. The RBS 200 may be configured to provide radio access to the UE 100.

Figure 4:
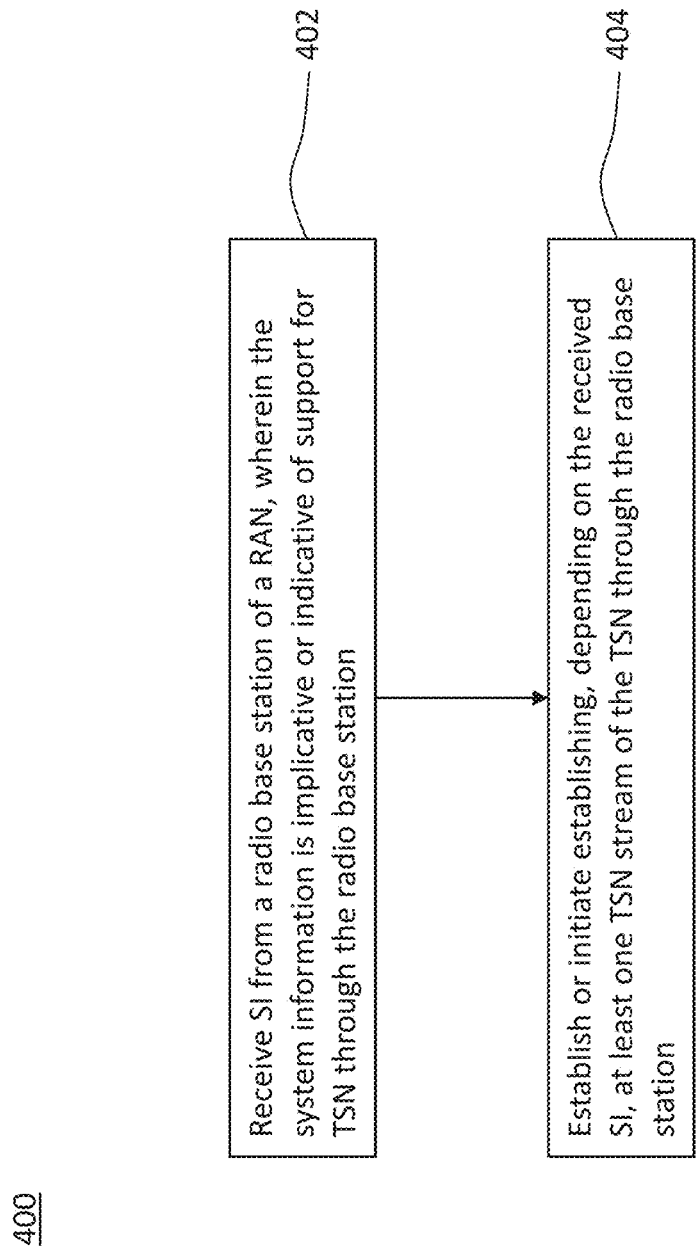
FIG. 4 shows a flowchart for implementing a method of handling Time-Sensitive Networking over a radio access network, which is implementable by the device of FIG. 1.

FIG. 4 shows a flowchart for a method 400 of handling TSN over a RAN. The method 400 comprises a step 402 of receiving SI from a RBS of the RAN. The SI is implicative or indicative as to support for TSN through the RBS. The SI may be RBS-specific. The method 400 further comprises a step 404 of establishing or initiating to establish, depending on the received SI, at least one TSN stream of the TSN through the RBS.

The method 400 may be performed by the device 100, e.g., the UE 100 radio-connected or radio-connectable to the RAN. For example, the modules 102 and 104 may perform the steps 402 and 404, respectively.

Figure 5:
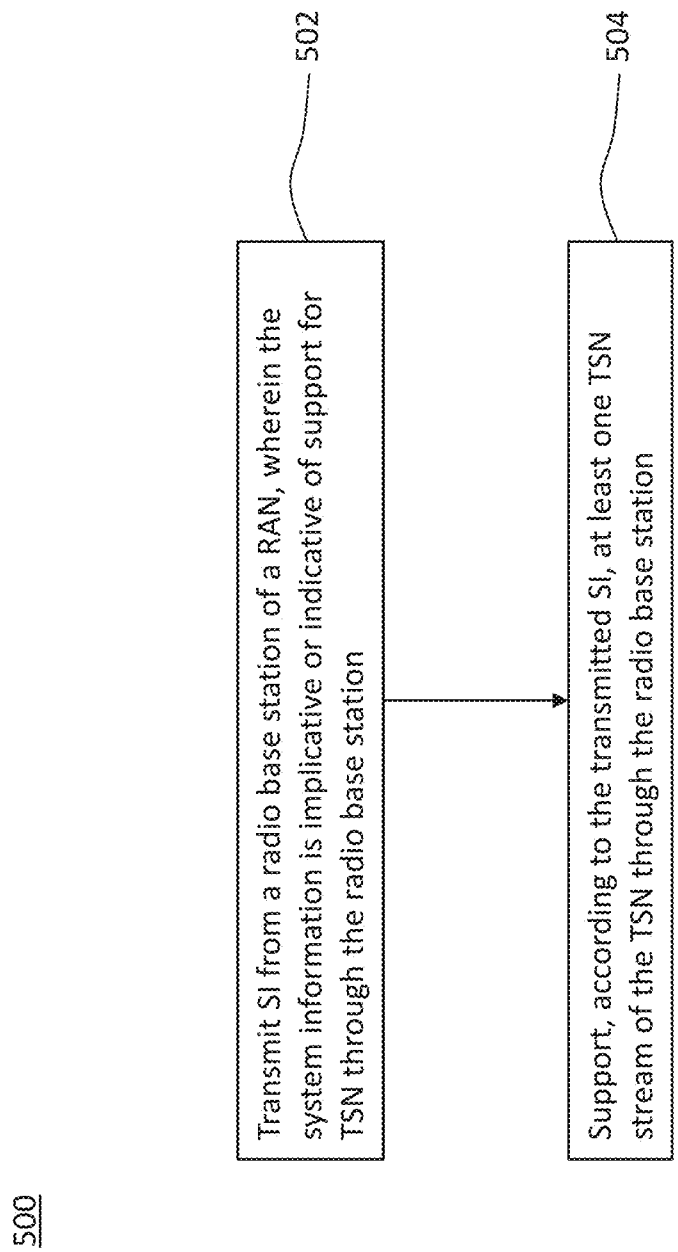
FIG. 5 shows a flowchart for implementing a method of announcing Time-Sensitive Networking over a radio access network, which is implementable by the device of FIG. 2.

FIG. 5 shows a flowchart for a method 500 of announcing TSN over a RAN. The method 500 comprises a step 502 of transmitting SI from a RBS of the RAN. The SI is implicative or indicative as to support for TSN through the RBS. The SI may be RBS-specific. The method 500 further comprises a step 504 of supporting, according to the transmitted SI, at least one TSN stream of the TSN through the RBS.

The method 500 may be performed by the device 200, e.g., at or using the RBS of the RAN. For example, the modules 202 and 204 may perform the steps 502 and 504, respectively.

Figure 6:
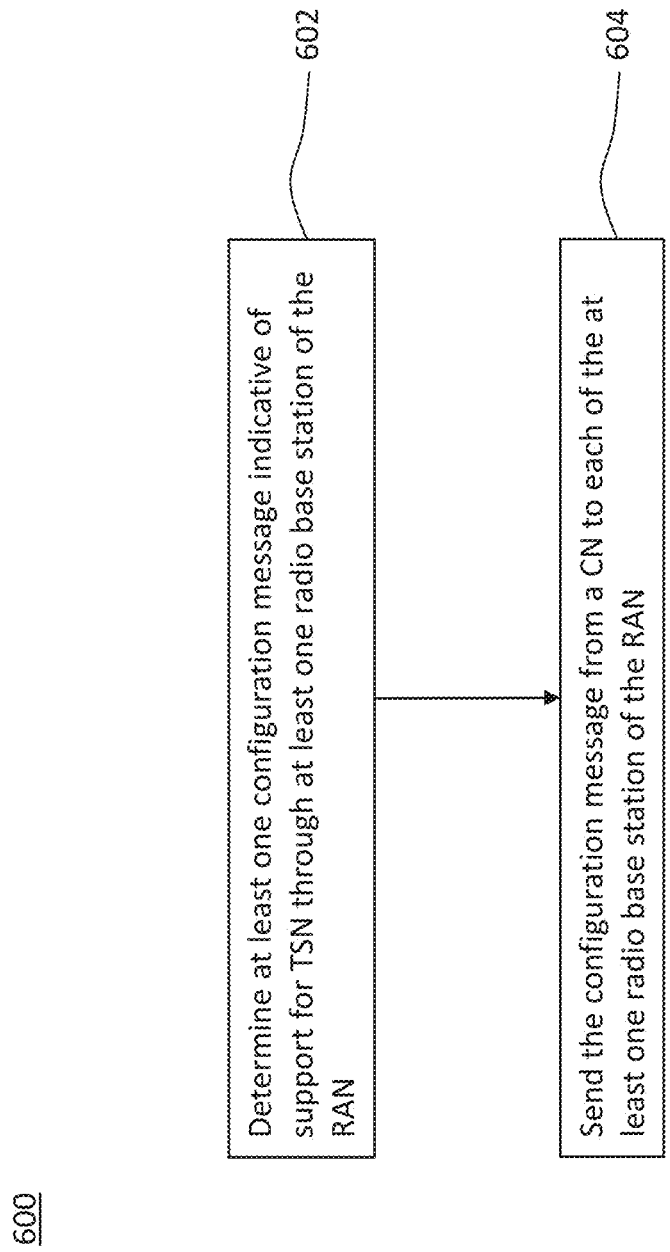
FIG. 6 shows a flowchart for implementing a method of distributing a configuration message for Time-Sensitive Networking over a radio access network, which is implementable by the device of FIG. 3.

FIG. 6 shows a flowchart for a method 600 of distributing a configuration message for TSN over a RAN. The method 600 comprises a step 602 of determining at least one configuration message indicative or implicative as to support for the TSN through at least one RBS of the RAN. The method 600 further comprises a step 604 of sending the at least one configuration message from a CN to each of the at least one RBS of the RAN.

The method 600 may be performed by the CN and/or the device 300, e.g., at or using a network component of the CN, the AMF or MME, and/or using a TSN function. The TSN function may be a Centralized Network Configuration (CNC) or a Centralized User Configuration (CUC). For example, the modules 302 and 304 may perform the steps 602 and 604, respectively.

The step 404 of establishing or initiating to establish, depending on the received SI, the at least one TSN stream may comprise selectively (e.g., conditionally) establishing or selectively (e.g., conditionally) initiating to establish the at least one TSN stream. The selectivity (e.g., conditionality) may be dependent on the received SI. The UE may decide, based on the SI from the RBS, whether to attempt establishing the TSN stream, e.g., prior to accessing or connecting with the base station, or not.

The step 404 of establishing or initiating to establish the at least one TSN stream may comprise selectively performing or selectively initiating to perform at least one of a random access procedure with the RBS 200 of the RAN; a radio resource control (RRC) connection setup with the RBS (200) of the RAN; and a network attach procedure with a CN connected to the RAN. The selectivity may be dependent on the received SI.

The establishing step 404 may comprise performing or initiating to perform a TSN application that uses the at least one established TSN stream. The TSN application or a client of the TSN application may be performed at the UE 100. The selectivity (e.g., the conditionality) in the step 404 may be fulfilled if the received SI is indicative of TSN features required by the TSN application.

The step 402 of receiving the SI is performed with respect to each of a plurality of RBSs 200 of the RAN. The step 404 of establishing or initiating to establish the at least one TSN stream may comprise selecting, among the plurality of RBSs 200, the RBS 200 the SI of which is indicative of TSN features required by the TSN application.

The RBS which best fulfills the required TSN features according to the respective SI may be selected (e.g., if none of the plurality of RBSs fulfills the required TSN features). Alternatively or in addition, the RBS which SI is indicative of the most preferably TSN features may be selected (e.g., if more than one of the plurality of RBSs fulfills the required TSN features).

The method 400 may further comprise a step of sending a control message to the CN. The control message may be indicative of TSN features required by the TSN application. The control message may be a non-access stratum (NAS) message.

The control message may be indicative of a request for the TSN. The control message may be forwarded to the CUC.

The SI may be implicative or indicative of at least one TSN feature supported by or through the RBS 200. The SI may be RBS-specific. The selectivity (e.g., the conditionality) in the step 404 may be dependent on the at least one supported TSN feature. Alternatively or in addition, the TSN stream may be established over the RAN depending on the at least one supported TSN feature. For example, the establishing of the at least one TSN stream may comprise performing or initiating to perform the random access with the RBS depending on the at least one supported TSN feature.

Herein, the TSN feature may encompass any feature or functionality available at the RBS for the TSN. The at least one TSN feature supported through the RBS may also be referred to as TSN capability of the RBS.

The at least one TSN feature may comprise at least one of a time-synchronization, a latency bound for the at least one TSN stream, and a reliability measure for the at least one TSN stream. The time-synchronization may be a time-synchronization of RBSs 200 and/or network components processing (e.g., transporting) the at least one TSN stream.

Alternatively or in addition, the SI may be indicative of a TSN configuration (also, TSN configuration scheme) for the TSN through the RBS 200. For example, the establishing 404 of the at least one TSN stream may comprise performing or initiating a TSN setup according to the TSN configuration. The TSN configuration may be indicative of an availability or unavailability of at least one of a CNC and a CUC.

The SI may be broadcasted from the RBS 200 in the step 502. The SI may be a broadcast message. The SI may be comprised in one or more system information blocks (SIBs).

The method 500 may further comprise a step of receiving a configuration message indicative of the support for TSN from the CN at the RBS 200. The SI transmitted by the RBS 200 may be derived from the received configuration message.

The SI may be implicative or indicative of at least one TSN feature supported by or through the RBS 200. The SI may be broadcasted in one or more SIBs.

The method 500 may further comprise any feature and/or step disclosed in the context of the device 100 and the method 400, or any feature or step corresponding thereto.

The configuration message may be sent from the AMF of the CN.

The configuration message may be implicative or indicative of at least one TSN feature supported or supposed to be supported by or through the RBS 200.

The method 600 may further comprise any feature or step of the methods 400 and 500, or any feature or step corresponding thereto.

Embodiments of the technique maintain compatibility with the 3GPP document TS 23.501, version 15.1.0, specifying "System Architecture for the 5G System" (Stage 2), or a successor thereof.

A network (e.g., a 5G network comprising the RAN providing NR access as defined by 3GPP) is configured to support TSN transmissions through at least some RBSs. For a UE to become attached to such a TSN network over the RAN (e.g., 5G radio or NR), there is no existing way to get information as to whether the network in general, and the RBS (e.g., a gNB) specifically, supports TSN transmissions or not. In embodiments of the technique, the SI enables the UE 100 to determine if and/or how certain TSN features are supported, before getting into radio resource control (RRC) connected mode and further signaling with the 5G network. Thus, the technique enables the UE 100 and, therefore, also a TSN application the UE 100 is connected to, to be aware of whether, which and/or how TSN features are supported by the network, specifically the RAN and/or the RBS transmitting the SI.

The SI may be implicative or indicative as to the support of TSN features. The TSN features may comprise at least one of time synchronization, redundancy, reliability, and latency (e.g., an estimated end-to-end latency).

Embodiments of the technique enable the UE 100 to receive necessary TSN-related information in the SI before getting attached to the 5G network. In this way, the UE 100 is aware of which TSN features are supported by the 5G network.

Furthermore, the 5G network may inform one or more UEs 100 in the same way about configuration details of the TSN network and/or how to, for example, perform time synchronization and network management.

For example, not all RBSs (e.g., gNBs) covering an area (e.g., deployed in a factory hall) support TSN traffic. The technique may be implemented to block those UEs 100 (also: TSN-UEs) that require TSN traffic from certain RBSs (e.g., gNBs), e.g., from those RBSs that do not support TSN or not the TSN features required by the UE 100.

The SI may be implemented by one or more System Information Blocks (SIBs).

An overall functionality and structure of a Master Information Block (MIB) and SIBs for NR may be essentially the same as for LTE. A difference between NR and LTE is that in NR provides two different types of SIBs. A first type of SIBs is transmitted periodically, e.g., equal or similar to SIB transmissions in LTE. A second type of SIBs is transmitted only when there is the request from the UE 100.

The SIBs are broadcasted by the RBS 200 (e.g., a gNB) and include the main part of the system information the UE 100 requires to access a cell served by the RBS 200 and other information on cell reselection. SIBs are transmitted over a Downlink Shared Channel (DL-SCH). The presence of the system information on the DL-SCH in a subframe is indicated by the transmission of a corresponding Physical Downlink Control Channel (PDCCH) marked with a special system-information Radio Network Temporary Identifier (SI-RNTI).

A number of the different SIBs are defined by 3GPP for LTE and NR, e.g., characterized by the type of the information included in the SIBs. This system information informs the UE 100 about the network capabilities. Not all SIBs are supposed to be present. SIBs are broadcasted repeatedly by the RBS 200 (e.g., the gNB).

Within a TSN network, i.e., a network supporting TSN, the communication endpoints are called TSN talker and TSN listener. At least one of the TSN talker and the TSN listener is an UE embodying the device 100. For the support of TSN, all RBSs 200 and network components (e.g., switches, bridges, or routers, which optionally embody the device 300) between the TSN talker and the TSN listener support certain TSN features, e.g. IEEE 802.1AS time synchronization. All nodes (e.g., RBSs and/or network components) that are synchronized in the network belong to a so-called TSN domain. TSN communication is only possible within such a TSN domain.

The device 300 may be embodied by one or more nodes or network components in the CN or the TSN network. Herein, in the description of embodiments, such alternative locations are referred to by reference signs of the form 300-$x$ for the x-th location.

TSN for a RAN or a RAN configured for TSN may comprise features for deterministic networking, which are also referred to as TSN features. The TSN features may comprise at least one of time synchronization, guaranteed (e.g., low) latency transmissions (e.g., an upper bound on latency), and guaranteed (e.g., high) reliability (e.g., an upper bound on packet error rate). The time synchronization may comprise a time synchronization between components of the RAN (e.g., the RBSs 200) and/or network components (e.g., in a backhaul domain and/or the CN).

Optionally, the SI is indicative of the TSN features supported through the respective RBS 200.

The supported TSN features may comprise or be compatible with at least one of the following group of categories. A first category comprises time synchronization, e.g. according to the standard IEEE 802.1AS. A second category comprises bounded low latency, e.g. according to at least one of the standards IEEE 802.1Qav, IEEE 802.1Qbu, IEEE 802.1Qbv, IEEE 802.1Qch, and IEEE 802.1Qcr. A third category comprises ultra-reliability, e.g. according to at least one of the standards IEEE 802.1CB, IEEE 802.1Qca, and IEEE 802.1Qci. A fourth category comprises network configuration and management, e.g. according to at least one of the standards IEEE 802.1Qat, IEEE 802.1Qcc, IEEE 802.1Qcp and IEEE 802.1CS.

The configuration and/or management of a TSN network including the RAN can be implemented in different manners, e.g., in a centralized or in a distributed setup as defined by the standard IEEE 802.1Qcc. Examples of different configuration models are described with reference to FIGS. 7, 8 and 9.

Figure 7:
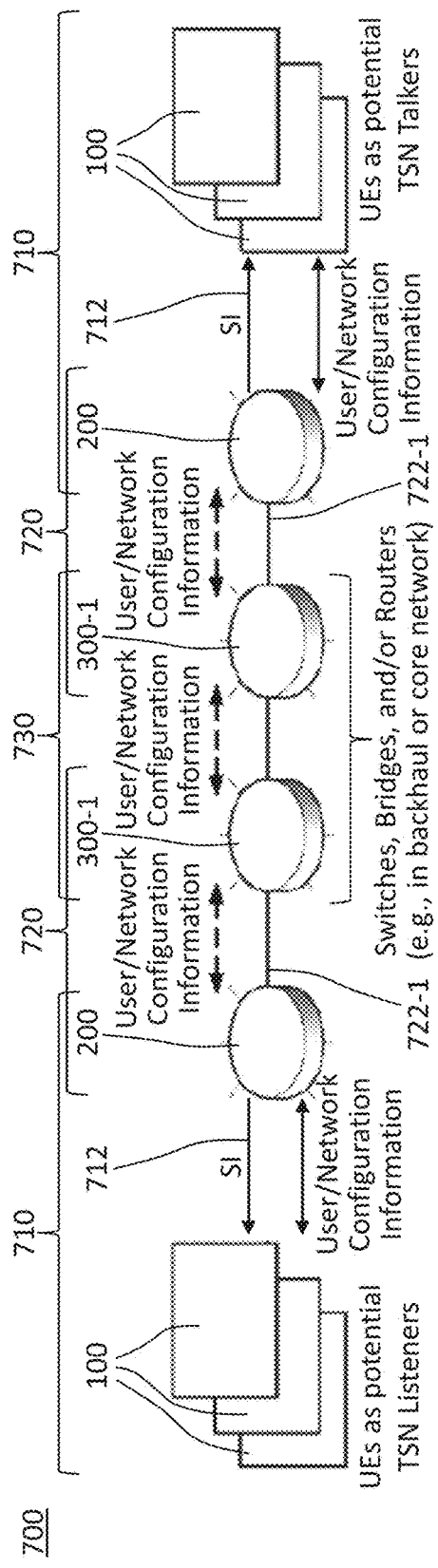
FIG. 7 shows a schematic block diagram of a first example of a communication system comprising embodiments of the devices of FIGS. 1 to 3.

FIG. 7 schematically illustrates a block diagram for a first example of a communications system 700 comprising embodiments of the devices 100, 200 and 300. The communication system 700 comprises the RAN 710 and the CN 730. The RAN 710 may comprise at least one embodiment of the device 200. The CN 730 may comprise at least one embodiment of the device 300, e.g., a network component 300-1. The network component 300-1 may be a switch, a bridge or a router. A backhaul domain 720 provides data links between the RBSs 200 of the RAN 710 and/or between the at least one RBS 200 and the CN 730. The data links may comprise at least one of microwave links, Ethernet links and fiber optical links.

The SI 712 is broadcasted by the RBS 200 to the UE 100 according to the steps 402 and 502. The RBS 200 is configured to broadcast the SI 712 according to the step 502 and to support the TSN stream according to the step 504 responsive to the configuration message 722-1 received from or through the network component 300-1.

In a scheme for distributed TSN configuration, which is illustrated by the first example in FIG. 7, there is no CUC and no CNC for the TSN network. The TSN talker 100 is, therefore, responsible for initiation of a TSN stream in the step 404. As no CNC is present, the network components 300-1 (e.g., switches or bridges) are configuring themselves, which may not allow using, for example, time-gated queuing as defined in IEEE 802.1Qbv. The distributed TSN configuration may be compatible or consistent with the document IEEE P802.1Qcc/D2.3, "Draft Standard for Local and metropolitan area networks—Bridges and Bridged Networks Amendment: Stream Reservation Protocol (SRP) Enhancements and Performance Improvements", IEEE TSN Task Group, e.g., draft status Mar. 5, 2018.

Figure 8:
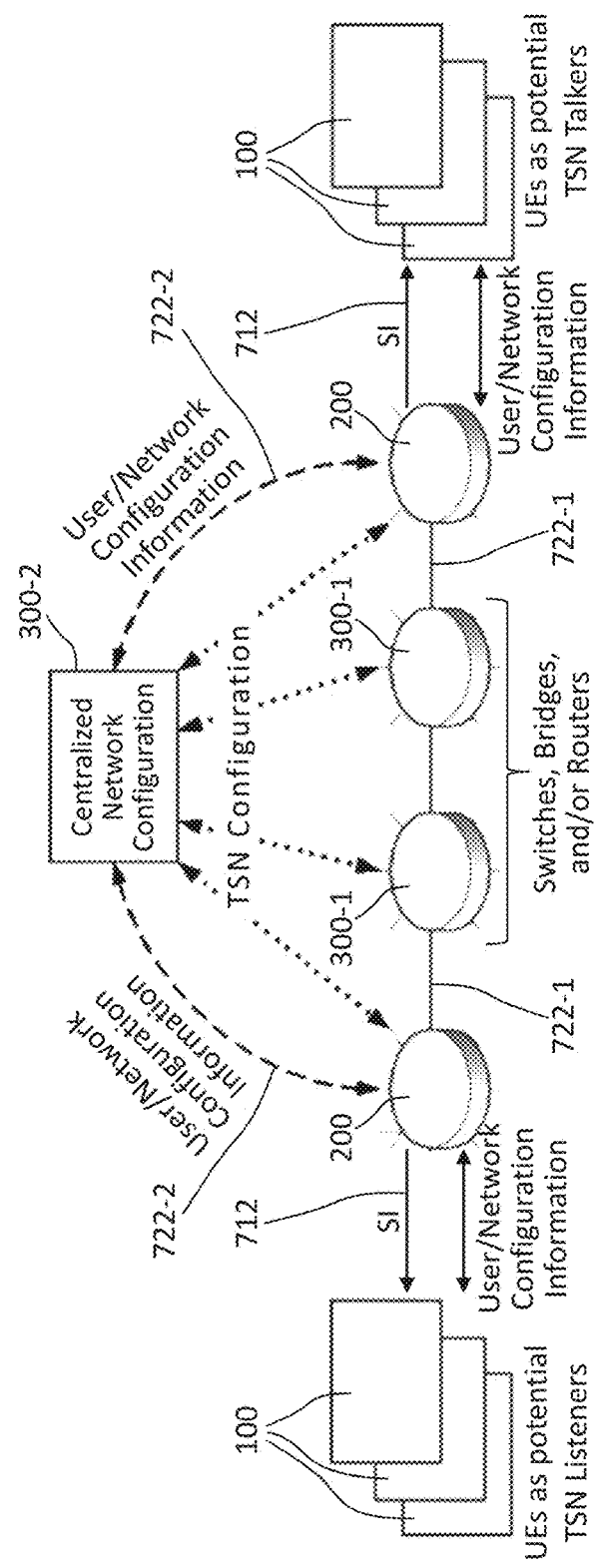
FIG. 8 shows a schematic block diagram of a second example of a communication system comprising embodiments of the devices of FIGS. 1 to 3.

In a first scheme for centralized TSN configuration, which is schematically depicted in FIG. 8 for a second example of the communication system 700, the TSN talker 100 is responsible for initialization of the TSN stream in the step 404, while the network components 300-1 are configured by a CNC 300-2. The centralized TSN configuration may be compatible or consistent with the document IEEE P802.1Qcc/D2.3.

The SI 712 is broadcasted by the RBS 200 to the UE 100 according to the steps 402 and 502. Alternatively or additionally to the configuration message 722-1, the RBS 200 is configured to broadcast the SI 712 according to the step 502 and to support the TSN stream according to the step 504 responsive to the configuration message 722-2 received from or through the CNC 300-2.

Figure 9:
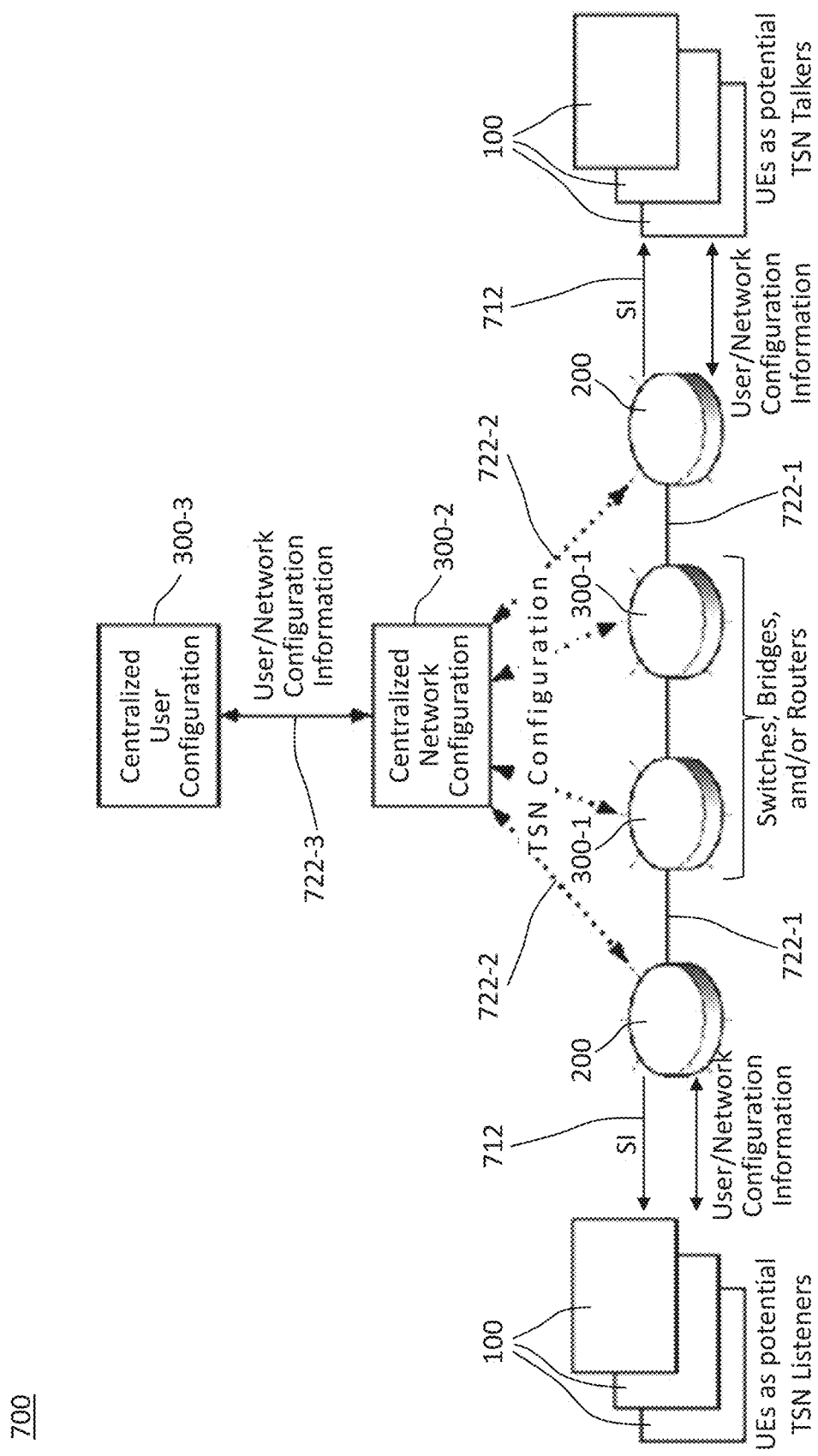
FIG. 9 shows a schematic block diagram of a third example of a communication system comprising embodiments of the devices of FIGS. 1 to 3.

In a second scheme for centralized TSN configuration (also: fully centralized TSN configuration), which is schematically depicted in FIG. 9 for a third example of the communication system 700, the network components 300-1 are configured by the CNC 300-2 and the CUC 300-3 with network configuration information and user configuration information, respectively. In one implementation, the CUC 300-3 may configure the network components to establish the TSN stream as soon as the TSN talker 100 is radio-connected to the RBS 200. In another implementation that is combinable with the one implementation, the TSN talker 100 is responsible for initialization of the at least one TSN stream, while quality requirements of the TSN talker 100 for the at least one TSN stream and/or the number of TSN streams for the TSN talker 100 is configured by the CUC 300-3. The fully centralized TSN configuration may be compatible or consistent with the document IEEE P802.1Qcc/D2.3.

The SI 712 is broadcasted by the RBS 200 to the UE 100 according to the steps 402 and 502. Alternatively or additionally to the configuration message 722-1 and/or the configuration message 722-2, the RBS 200 is configured to broadcast the SI 712 according to the step 502 and to support the TSN stream according to the step 504 responsive to the configuration message 722-3 received from the CUC 300-3.

Optionally, e.g. in any of the three examples for the communication system 700, the SI 712 is transmitted on a broadcast channel of the RAN 710. The SI 712 may (e.g., positively) indicate the support of the TSN, e.g., without user and/or network configuration information. The UE 100 may receive the user and/or network configuration information on a downlink control channel from the RBS 200, by TSN-specific protocols and/or from the CN 710 (e.g., the device 300-1) using a non-access stratum (NAS) protocol. Alternatively or in combination, the SI 712 may comprise (at least partly) the user and/or network configuration information.

The TSN communication between TSN talker (as an embodiment of the device 100) and TSN listener (which may or may not be a further embodiment of the device 100) happens in TSN streams. A TSN stream is based on certain requirements in terms of data rate and latency given by an application (TSN application) implemented at the TSN talker and the TSN listener. The TSN configuration and management features are used to setup the TSN stream and to guarantee the requirements of the TSN stream across the network.

In the distributed scheme (e.g., according to the first example in FIG. 7), the TSN talker 100 and the TSN listener 100 may use the Stream Reservation Protocol (SRP) to setup and configure the at least one TSN stream in every RBS 200 and/or every network component 300-1 (e.g., every switch) along the path from the TSN talker 100 to the TSN listener 100 in the TSN network. Optionally, some TSN features require the CNC 300-2 as a central management entity (e.g., according to the second example in FIG. 8). The CNC 300-2 uses for example a Network Configuration Protocol (Netconf) and/or "Yet Another Next Generation" (YANG) models to configure the RBS 200 and/or the network components 300-1 (e.g., switches) in the network for each TSN stream. This also allows the use of time-gated queuing as defined in IEEE 802.1Qbv that enables data transport in a TSN network with deterministic latency. With time-gated queuing on each RBS 200 and/or each network component 300-1 (e.g., switch), queues are opened or closed following a precise schedule that allows high priority packets to pass through the RBS 200 or network component 300-1 with minimum latency and jitter if it arrives at ingress port within the time the gate is scheduled to be open. In the fully centralized scheme (e.g., according to the third example in FIG. 9), the communication system 700 comprises a CUC 300-3 as a point of contact for the TSN listener 100 and/or the TSN talker 100. The CUC 300-3 collects stream requirements and/or endpoint capabilities from the TSN listener 100 and/or the TSN talker 100. The CUC 300-3 may communicate with the CNC 300-2 directly. The TSN configuration may be implemented as explained in the standard IEEE 802.1Qcc in detail.

Figure 10:
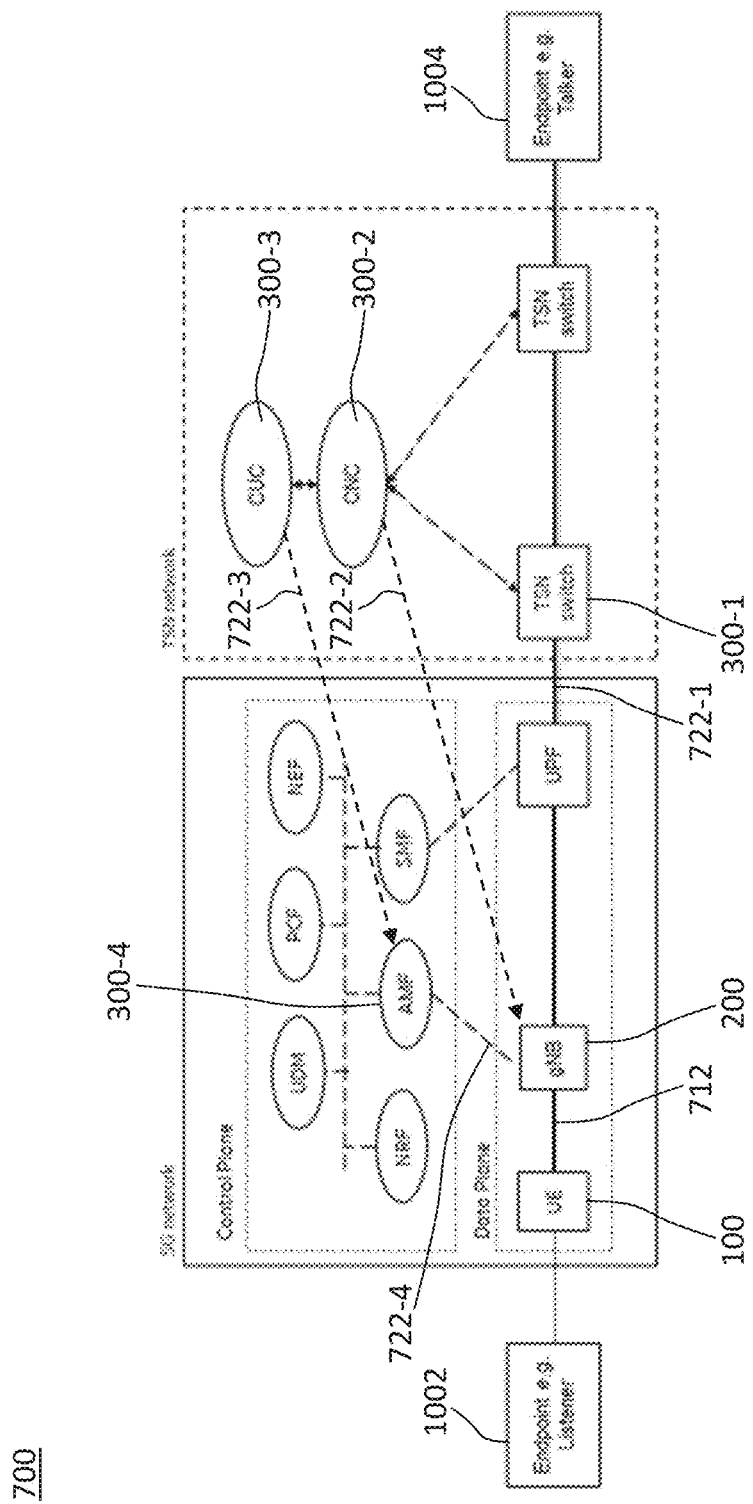
FIG. 10 shows a functional block diagram of a fourth example of a communication system comprising embodiments of the devices of FIGS. 1 to 3.

FIG. 10 shows a functional block diagram for a fourth example of a communication system 700 comprising embodiments of the devices 100, 200 and 300. The fourth example may further comprise any of the feature described for the first, second and/or third example, wherein like reference signs refer to interchangeable or equivalent features. An optional interworking between the 5G network (e.g., comprising the RAN 710 and the CN 730) and the TSN network architecture (e.g., the CNC 300-2 and the CUC 300-3) may be based on at least one of the control messages 722-2 and 722-3 from the CNC 300-2 and the CUC 300-3, respectively, e.g., as illustrated in FIG. 10. At least one of the control messages 722-2 and 722-3 may be forwarded to the AMF 300-4 (in the CN 730) and/or to the RBS 200 (in the RAN 710) using a control plane of the 5G network. Alternatively or in addition, the CN 730, e.g., the AMF 300-4, may implement at least one of the CNC 300-2 and the CUC 300-3.

The technique enables connecting TSN listener 100 and TSN talker 100 wirelessly to a TSN network, e.g., using a 5G network as defined by 3GPP. The 5G standard defined by 3GPP addresses factory use cases through a plurality of features, especially on the RAN (e.g., providing 5G NR) to make it more reliable and reduce the transmit latency compared to an evolved UMTS radio access network (E-UTRAN, i.e., the radio access technology of 4G LTE).

The 5G network comprises the UE 100, the RAN 730 instantiated as the gNB 200 and nodes 300-4 within the core network (5G CN). An example for the 5G network architecture is illustrated on the left-hand side in FIG. 10. An example for the TSN network architecture is illustrated on the right-hand side in FIG. 10.

Both technologies, the 5G network and the TSN network, define own methods for network management and/or configuration. Different mechanisms to achieve communication determinism are arranged to enable end-to-end deterministic networking to support TSN streams, e.g., for industrial networks. A study item for upcoming 3GPP release 16 has been initiated in the 3GPP document RP-181479 to support TSN, e.g., for factory automation use cases.

Herein, the UE 100 being the radio device connected to the RAN 710 (and thus to the 5G network) may also be referred to as a 5G endpoint. A device connected to the TSN network (also, TSN domain) may be referred to as a TSN endpoint.

Despite what is shown in FIG. 10, it is also possible that the UE 100 is not connected to a single endpoint but instead to a TSN network comprising at least one TSN bridge and at least one endpoint. The UE 100 is then part of a TSN-5G gateway.

The control plane of the 5G network may comprise at least one of a Network Repository Function (NRF), the AMF 300-4, a Session Management Function (SMF), a Network Exposure Function (NEF), a Policy Control Function (PCF), and a Unified Data Management (UDM).

A data plane of the 5G network comprises a User Plane Function (UPF), at least one embodiment of the RBS 200, and/or at least one embodiment of the UE 100.

A TSN listener 1002 may be embodied by or performed (e.g., as an application) at the UE 100. While the UE 100 operates as or is used by the TSN listener 1002 in the fourth example of the communication system 700 shown in FIG. 10, the UE 100 may alternatively or additionally operate as a TSN talker in any example. Optionally, a TSN talker 1004 is embodied by another UE 100 connected through the same or another RBS 200 to the communication system 700.

The step 604 of the method 600 may be implemented according to at least one of the following variants (e.g., in the context of any of the four examples of the communication system 700 in FIGS. 7 to 10). In a first variant, the CNC 300-2 configures the gNB 200 by sending the configuration message 722-2. In a second variant, the CUC 300-3 sends the configuration message 722-3 to the AMF 300-4 and, thereby, configures the gNB 200. For example, the AMF 300-4 forwards the configuration message 722-3 to the gNB 200 or derives the configuration message 722-4 from the configuration message 722-3. In a third variant (not shown), the CUC 300-3 sends the configuration message 722-3 to the gNB 200. In a fourth variant (not shown), the CNC 300-2 sends the configuration message 722-2 to the AMF 300-4. Optionally, e.g., in any of the variants, the AMF 300-4 implements at least one of the CNC 300-2 and the CUC 300-3.

Alternatively or in addition, the CNC 300-2 sends the configuration message 722-2 to the network component 300-1 (e.g., a switch or a router) and, thereby, configures the gNB 200. For example, the network component 300-1 forwards the configuration message 722-2 to the gNB 200 or derives the configuration message 722-1 from the configuration message 722-2.

While the technique is described herein with embodiments in the context manufacturing and factory automation for clarity and concreteness, the technique may further be applicable to automotive communication and home automation.

Figure 11:
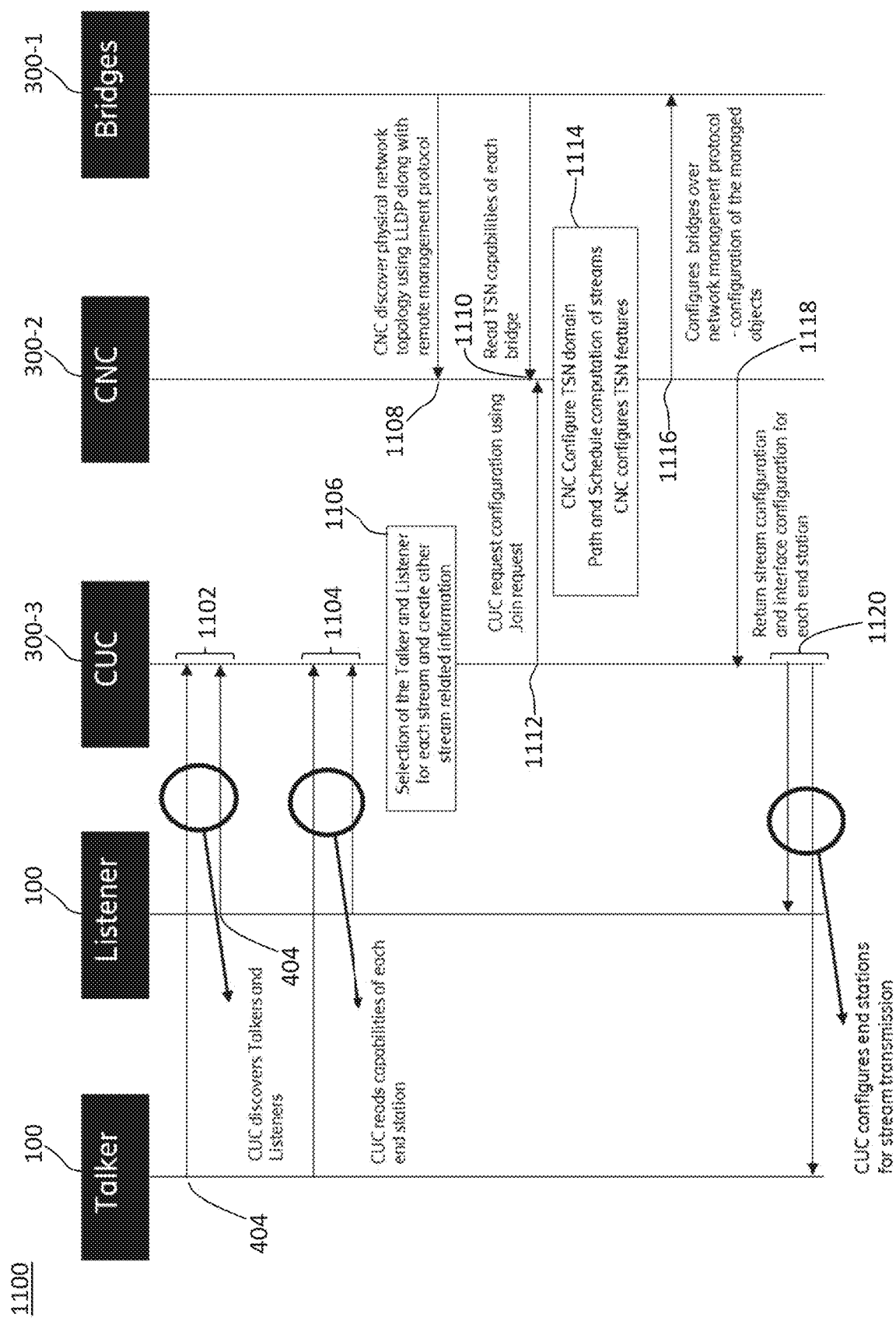
FIG. 11 shows a first schematic signaling diagram for a communication system comprising embodiments of the devices of FIGS. 1 to 3.

FIG. 11 shows a signaling diagram 1100 for TSN Stream Configuration involving exemplary embodiments of the device 100 (e.g., a UE 100 as the TSN talker and/or a UE 100 as the TSN listener) and exemplary embodiments of the device 300 (namely 300-1, 300-2 and 300-3). While these multiple embodiments of the devices 100 and 300 are shown and described in combination, any subcombination may be realized. For example, only one of the network component 300-1, the CNC 300-2 and the CUC 300-3 may embody the device 300. Alternatively or in addition, only one of the TSN talker and the TSN listener may be an embodiment of the device 100.

The steps for the TSN Stream Configuration (e.g., according to the signaling diagram 1100) may be performed after the UE 100 has decided to access (e.g., radio-connect and/or attach to) the RBS 200 (not shown in FIG. 10 for simplicity) based on the SI received in the step 402. The step 404 may initiate at least one of the steps for the TSN Stream Configuration.

Each UE 100 implementing a TSN talker or a TSN listener is radio-connected through an embodiment of the RBS 200 to at least one of the network component 300-1, the CNC 300-2 and the CUC 300-3. The UEs 100 may be radio-connected through the same RBS 200 or different RBSs 200. The TSN Stream Configuration may be compatible or consistent with IEEE 802.1Qcc.

The TSN Stream Configuration (i.e., setting up the at least one TSN stream in the TSN network) according to the fully centralized configuration scheme comprises at least one of the following steps.

In a first step 1102, the CUC 300-3 may take input from e.g. an industrial application or engineering tool (e.g. a programmable logic controller, PLC), which specifies for example the devices, which are supposed to exchange time-sensitive streams (i.e., TSN streams). The PLC may be adapted to control manufacturing processes, such as assembly lines, or robotic devices, or any activity that requires high reliability control and/or ease of programming and process fault diagnosis.

In a second step 1104, the CUC 300-2 reads the capabilities of end stations and applications in the TSN network, which includes period and/or interval of user traffic and payload sizes.

In a third step 1106, based on this above information, the CUC 300-3 creates at least one of a StreamID as an identifier for each TSN stream, a StreamRank, and UsertoNetwork Requirements.

In a fourth step 1108, the CNC 300-2 discovers the physical network topology using, for example, a Link Layer Discovery Protocol (LLDP) and any network management protocol.

In a fifth step 1110, the CNC 300-2 uses a network management protocol to read TSN capabilities of bridges (e.g., IEEE 802.1Q, 802.1AS, 802.1CB) in the TSN network.

In a sixth step 1112, the CUC 300-3 initiates join requests to configure the at least one TSN stream in order to configure network resources at the bridges 300-1 for a TSN stream from one TSN talker 100 to one TSN listener 100.

In a seventh step, a group of the TSN talker 100 and the TSN listener 100 (i.e., a group of elements specifying a TSN stream) is created by the CUC 300-3, e.g., as specified in the standard IEEE 802.1Qcc, clause 46.2.2.

In an eighth step 1114, the CNC 300-2 configures the TSN domain, checks physical topology and checks if the time sensitive streams are supported by bridges in the network, and performs path and schedule computation of streams.

In a ninth step 1116, the CNC 300-2 configures TSN features in bridges along the path in the TSN network.

In a tenth step 1118, the CNC 300-2 returns status (e.g., success or failure) for resulting resource assignment for the at least one TSN stream to the CUC 300-3.

In a eleventh step 1120, the CUC 300-3 further configures end stations (wherein a protocol used for this information exchange may be out of the scope of the IEEE 802.1Qcc specification) to start the user plane traffic exchange, as defined initially between the TSN listener 100 and the TSN talker 100.

In the TSN network, the streamID is used to uniquely identify stream configurations. It is used to assign TSN resources to the TSN stream of a TSN talker. The streamID comprises the two tuples MacAddress and UniqueID. The MacAddress is associated with the TSN talker 100. The UniqueID distinguishes between multiple streams within end stations identified by the same MacAddress.

Any embodiment and implementation of the technique may encode the SI 712 in dedicated information elements in one or more SIBs. According to the step 402 and 502, a UE 100 is enabled to detect TSN features that are supported by the RBS 200 of the network and/or how they are supported. The UE 100 receives the SI 712 before it attaches to the network, and can check first by listening to an SIB message comprising the SI 712. The received SI 712 may be forward to the TSN application 1002 or 1004 the UE 100 is serving, and/or the UE 100 uses the SI 712 to setup a connection to the 5G network.

Any embodiment of the RBS 200 may implement the technique by including one or more SIBs and/or information elements in SIBs for indicating to the UE 100 the TSN features and/or TSN configuration details supported by the 5G network, e.g., specifically be the RBS 200.

Any embodiment of the UE 100 may implement the step 402 by reading the one or more SIBs and/or the information element included therein. Optionally, the included information as to supported TSN features and/or TSN configuration are forwarded to the TSN applications it is serving. Conditionally, i.e., depending on the features indicated as supported in the SI 712, the information is used to establish a connection to the RBS (e.g., to the 5G network).

An (e.g., expandable) example of a SIB block structure for the SI 712 in the steps 402 and 502 is outlined below using Abstract Syntax Notation One (ASN.1). The same information may also be included in the configuration message 722 of the method 600.

ASN1START
SystemInformationBlockType16-r11::=SEQUENCE {
  TSNFeatures SEQUENCE {
    Time synchronisation Boolean
    Time Synchronisation accuracy Integer; OPTIONAL,
      —Need OR
    FRER Boolean
    TSN configuration details Integer
    Credit based shaper boolean
    Time aware shaper boolean
    Max. Latency added by 5G network integer}
}

Furthermore, the SIB blocks may be adapted to future versions of TSN features by, for example, introducing reserved fields to be defined in the future.

For end-to-end time synchronization (e.g., provisioning of an absolute time reference) multiple ways of implementation are possible. The SI 712 may comprise information about how the time synchronization is treated by the RAN (e.g., the 5G network).

The "FRER" parameter refers to the redundancy features that are supported by the 5G network. In case the network does not support redundancy, there is no need to establish, e.g., redundant protocol data unit (PDU) sessions.

The TSN configuration may include the presence of the CUC 300-3 and/or the CNC 300-2 in the TSN network and/or specific TSN configuration schemes that are supported.

The "Max. Latency added by 5G network" parameter may be used to signal a QoS level in terms of latency and/or reliability that can be supported by the 5G network to the UE 100. A field representing this parameter may comprise a latency value (e.g., in milliseconds) that can be guaranteed with a sufficient reliability or a classification value (e.g., non-real-time, real-time, hard-real-time or similar). The value may be indicated by a predefined index value. This information may be used by the UE 100 (or the endpoint 1002 or 1004 of the TSN network behind the UE 100) to find out before connection establishment if a connection to the RBS 200 (or the 5G network) will be able to support the requirements of the TSN application 1002 or 1004, or not.

The RBS 200 (e.g., a gNB) may further include a current cell load and/or other metrics into the calculation of that field. Optionally, the SI 712 is indicative of a traffic shaper support, which refers to a quality of service (QoS) that may be guaranteed by the RBS (e.g., the 5G network). For example, the SI 712 may be indicative of whether the shaper is based on credit (e.g., data volume per time and UE) or a time aware shaper (TAS) for TSN.

Figure 12:
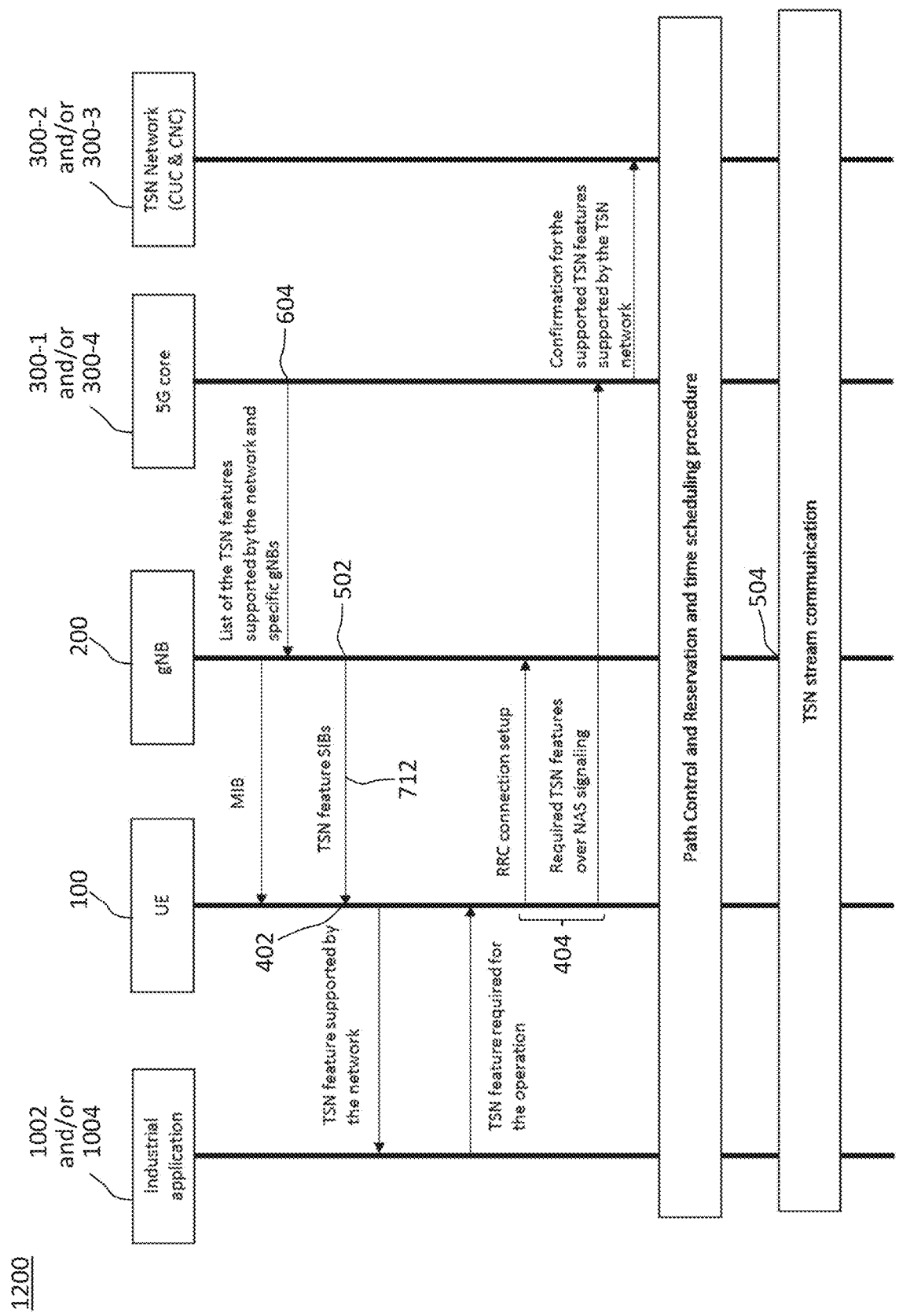
FIG. 12 shows a second schematic signaling diagram for a communication system comprising embodiments of the devices of FIGS. 1 to 3.

FIG. 12 shows a signaling diagram 1200 resulting from implementations of the methods 400, 500 and 600 being performed by embodiments of the devices 100, 200 and 300, respectively. More specifically, the technique enables an embodiment of the UE 100 to become aware of TSN features supported by the network over the SI 712 included in one or more SIBs. While the signaling diagram 1200 (and the corresponding flowchart) for TSN stream configuration uses the fully centralized configuration scheme (e.g., as shown in FIG. 9), the technique is readily applicable to other configuration schemes (e.g., as shown in FIG. 7 or 8).

The implementations of the methods 400, 500 and 600 enable the UE 100 to get aware of TSN features supported by the network and/or specifically by the RBS 200 over the one or more SIBs including the SI 712.

In the step 604, a 5G core function (e.g., the AMF 300-4) indicates by sending the configuration message 722 to specific RBSs 200 (e.g., gNBs) which TSN features (e.g., according to above non-exhaustive list) are supported or supposed to be enabled (e.g., only a subset of all gNBs might support TSN) and how these TSN features are supported.

Responsive to the reception of the configuration message 722 (e.g., any of the above implementations 722-1 to 722-4), the RBS 200 (e.g., a gNB) generates the SI 712 (e.g., the SIB block information as outlined above) and starts broadcasting the SI 712, e.g. over the DL-SCH, in the step 502.

The UE 100 receives and/or reads the SI 712 in the SIB in the step 402. Optionally, the UE 100 transfers at least some of the information in the SI 712 to the TSN application 1002 or 1004, e.g., a list of the TSN features supported by the RBS 200. The TSN application 1002 or 1004 may request a TSN connection towards the UE 100, if the supported list of TSN features is sufficient, as an example for the conditionality or selectivity in the step 404.

For initiating the TSN stream in the step 404, the UE 100 goes into RRC connected mode if not already in that mode and requests a PDU session, which may be of Ethernet type. UE may further provide information by means of NAS signaling on which TSN features are required.

A TSN controller (e.g., the CNC 300-2) receives a confirmation from the CN 730 and performs path computation and time scheduling. TSN stream communication starts, wherein the RBS 200 supports the TSN stream according to the step 504.

In any embodiment, the UE 100 may defer or refrain from requesting the RRC connection setup in the step 404, if the TSN application requires certain TSN features and the UE 100 did not receive in the SIB broadcast 402 that one or more of these features are supported, as an example for the conditionality or selectivity in the step 404.

In same or another embodiment, the UE 100 reads the SI 712 (i.e., the TSN information included in the one or more SIBs) of multiple RBSs 200 (e.g., gNBs) and selects the RBS 200, which best fulfills the TSN requirements of the UE 100. If all RBS 200 fulfill the requirements, the UE 100 may act according to a selection rule, e.g. selecting the RBS 200 indicating the lowest latency.

In any embodiment, the UE 100 may store the SI 712 received in the step 402. The technique may be implemented as described up until and including the step 402. When the TSN application 1002 or 1004 requests a TSN communication (i.e., one or more TSN streams), the UE 100 uses the stored SI 712 to either setup the at least one TSN stream in the supported way or declines the TSN request if it is not supported. The UE 100 may further use the SI 712 from the SIB, e.g., to initialize packet filtering of packets coming in for TSN transmission. Furthermore, the received SI 712 may be used to establish a default PDU session with the 5G network.

Figure 13:
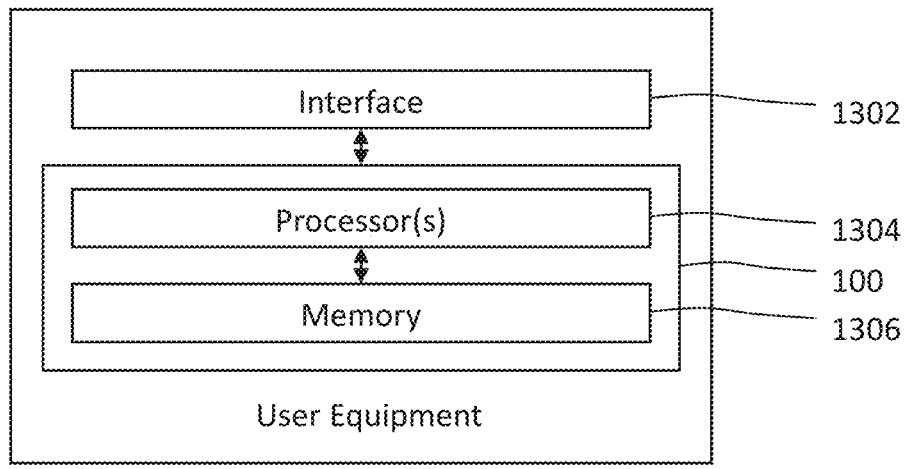
FIG. 13 shows a schematic block diagram of an embodiment of the device of FIG. 1.

FIG. 13 shows a schematic block diagram for an embodiment of the device 100. The device 100 comprises one or more processors 1304 for performing the method 400 and memory 1306 coupled to the processors 1304. For example, the memory 1306 may be encoded with instructions that implement at least one of the modules 102 and 104.

The one or more processors 1304 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1306, data transmitter functionality, TSN talker functionality, data receiver functionality, and/or TSN listener functionality. For example, the one or more processors 1304 may execute instructions stored in the memory 1306. Such functionality may include providing various features and steps discussed herein, including any of the benefits disclosed herein. The expression "the device being operative to perform an action" may denote the device 100 being configured to perform the action.

As schematically illustrated in FIG. 13, the device 100 may be embodied by a UE 1300, e.g., radio-connected or radio-connectable to the RAN 710. The UE 1300 comprises a radio interface 1302 coupled to the device 100 for radio communication with one or more RBSs.

Figure 14:
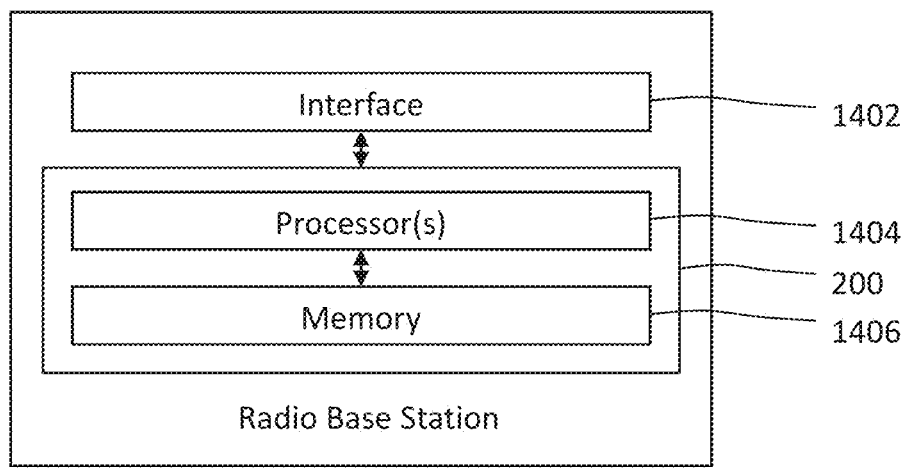
FIG. 14 shows a schematic block diagram of an embodiment of the device of FIG. 2.

FIG. 14 shows a schematic block diagram for an embodiment of the device 200. The device 200 comprises one or more processors 1404 for performing the method 500 and memory 1406 coupled to the processors 1404. For example, the memory 1406 may be encoded with instructions that implement at least one of the modules 202 and 204.

The one or more processors 1404 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1406, data receiver or RAN functionality. For example, the one or more processors 1404 may execute instructions stored in the memory 1406. Such functionality may include providing various features and steps discussed herein, including any of the benefits disclosed herein. The expression "the device being operative to perform an action" may denote the device 200 being configured to perform the action.

As schematically illustrated in FIG. 14, the device 200 may be embodied by a RBS 1400, e.g., of the RAN 710. The RBS 1400 comprises a radio interface 1402 coupled to the device 200 for radio communication with one or more UEs.

Figure 15:
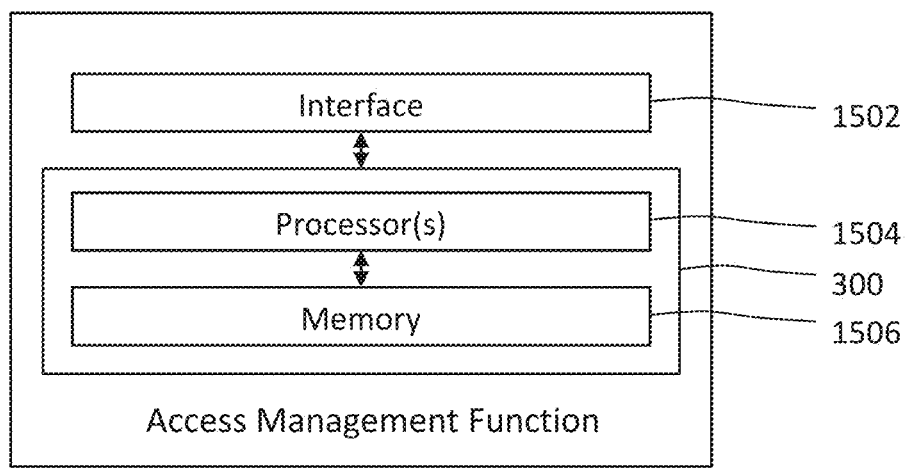
FIG. 15 shows a schematic block diagram of an embodiment of the device of FIG. 3.

FIG. 15 shows a schematic block diagram for an embodiment of the device 300. The device 300 comprises one or more processors 1504 for performing the method 600 and memory 1506 coupled to the processors 1504. For example, the memory 1506 may be encoded with instructions that implement at least one of the modules 302 and 304.

The one or more processors 1504 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 1506, base station functionality or RAN functionality. For example, the one or more processors 1504 may execute instructions stored in the memory 1506. Such functionality may include providing various features and steps discussed herein, including any of the benefits disclosed herein. The expression "the device being operative to perform an action" may denote the device 300 being configured to perform the action.

As schematically illustrated in FIG. 15, the device 300 may be embodied by an AMF 1500, e.g., of the CN 730. The AMF 1500 comprises an interface 1502 (e.g., an S1 interface or NG2 reference point) coupled to the device 300 for radio communication with one or more UEs.

Figure 16:
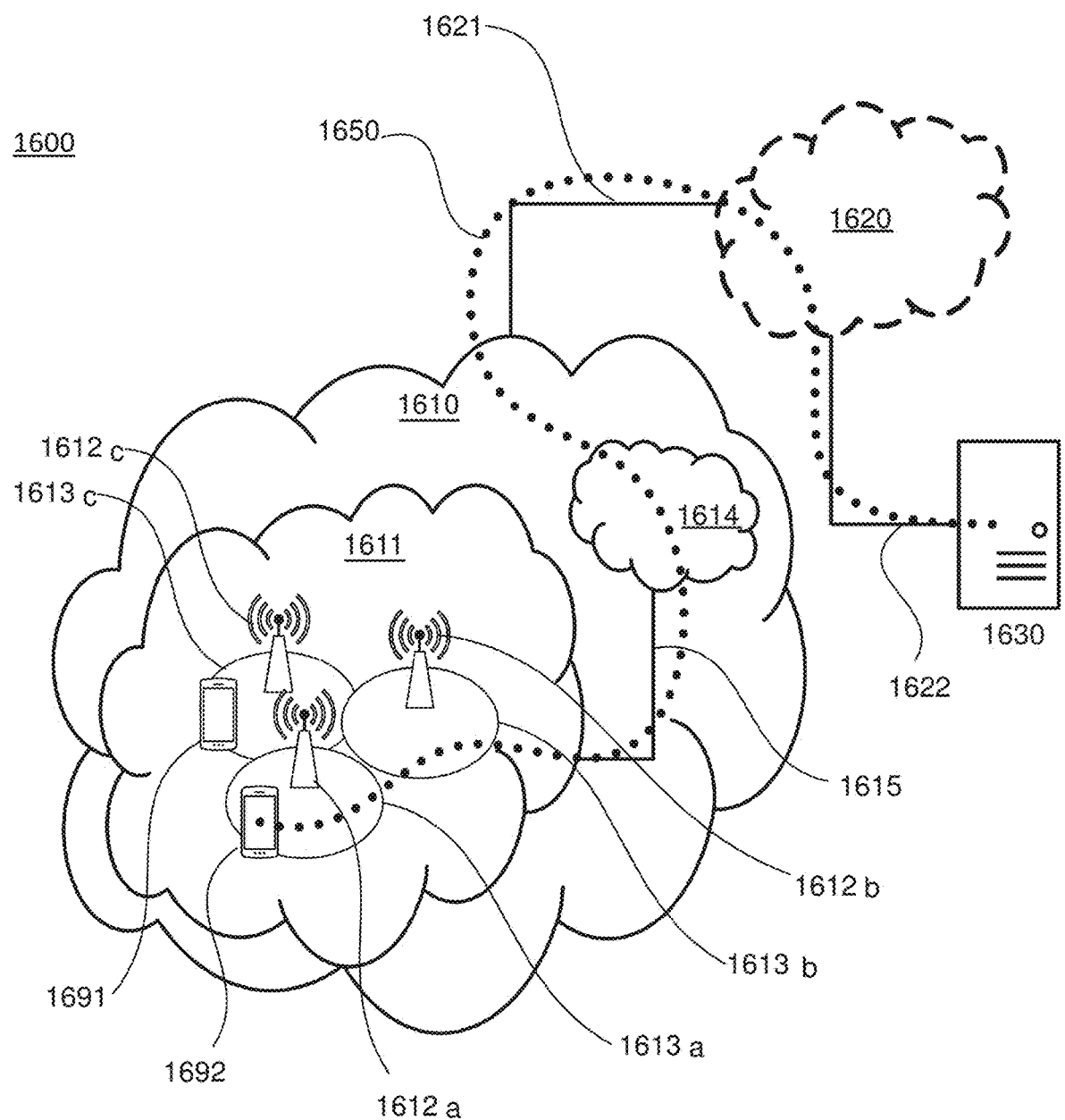
FIG. 16 schematically illustrates a telecommunication network connected via an intermediate network to a host computer.

With reference to FIG. 16, in accordance with an embodiment, a communication system 1600 includes a telecommunication network 1610, such as a 3GPP-type cellular network, which comprises an access network 1611, such as the RAN, and an embodiment of the CN 1614. The access network 1611 comprises a plurality of RBSs 1612a, 1612b, 1612c, such as NBs, eNBs, gNBs or other types of wireless access points, each defining a corresponding coverage area 1613a, 1613b, 1613c. Each RBS 1612a, 1612b, 1612c is connectable to the core network 1614 over a wired or wireless connection 1615. A first UE 1691 located in coverage area 1613c is configured to wirelessly connect to, or be paged by, the corresponding RBS 1612c. A second UE 1692 in coverage area 1613a is wirelessly connectable to the corresponding RBS 1612a. While a plurality of UEs 1691, 1692 are illustrated in this example, the disclosed embodiments are equally applicable to a situation where a sole UE is in the coverage area or where a sole UE is connecting to the corresponding RBS 1612.

The telecommunication network 1610 is itself connected to a host computer 1630, which may be embodied in the hardware and/or software of a standalone server, a cloud-implemented server, a distributed server or as processing resources in a server farm. The host computer 1630 may be under the ownership or control of a service provider, or may be operated by the service provider or on behalf of the service provider. The connections 1621, 1622 between the telecommunication network 1610 and the host computer 1630 may extend directly from the core network 1614 to the host computer 1630 or may go via an optional intermediate network 1620. The intermediate network 1620 may be one of, or a combination of more than one of, a public, private or hosted network; the intermediate network 1620, if any, may be a backbone network or the Internet; in particular, the intermediate network 1620 may comprise two or more sub-networks (not shown).

The communication system 1600 of FIG. 16 as a whole enables connectivity between one of the connected UEs 1691, 1692 and the host computer 1630. The connectivity may be described as an over-the-top (OTT) connection 1650. The host computer 1630 and the connected UEs 1691, 1692 are configured to communicate data and/or signaling via the OTT connection 1650, using the access network 1611, the core network 1614, any intermediate network 1620 and possible further infrastructure (not shown) as intermediaries. The OTT connection 1650 may be transparent in the sense that the participating communication devices through which the OTT connection 1650 passes are unaware of routing of uplink and downlink communications. For example, a RBS 1612 may not or need not be informed about the past routing of an incoming downlink communication with data originating from a host computer 1630 to be forwarded (e.g., handed over) to a connected UE 1691. Similarly, the RBS 1612 need not be aware of the future routing of an outgoing uplink communication originating from the UE 1691 towards the host computer 1630.

Example implementations, in accordance with an embodiment, of the UE, the RBS and host computer discussed in the preceding paragraphs will now be described with reference to FIG. 17. In a communication system 1700, a host computer 1710 comprises hardware 1715 including a communication interface 1716 configured to set up and maintain a wired or wireless connection with an interface of a different communication device of the communication system 1700. The host computer 1710 further comprises processing circuitry 1718, which may have storage and/or processing capabilities. In particular, the processing circuitry 1718 may comprise one or more programmable processors, application-specific integrated circuits, field programmable gate arrays or combinations of these (not shown) adapted to execute instructions. The host computer 1710 further comprises software 1711, which is stored in or accessible by the host computer 1710 and executable by the processing circuitry 1718. The software 1711 includes a host application 1712. The host application 1712 may be operable to provide a service to a remote user, such as a UE 1730 connecting via an OTT connection 1750 terminating at the UE 1730 and the host computer 1710. In providing the service to the remote user, the host application 1712 may provide user data, which is transmitted using the OTT connection 1750.

The communication system 1700 further includes a RBS 1720 provided in a telecommunication system and comprising hardware 1725 enabling it to communicate with the host computer 1710 and with the UE 1730. The hardware 1725 may include a communication interface 1726 for setting up and maintaining a wired or wireless connection with an interface of a different communication device of the communication system 1700, as well as a radio interface 1727 for setting up and maintaining at least a wireless connection 1770 with a UE 1730 located in a coverage area (not shown in FIG. 17) served by the RBS 1720. The communication interface 1726 may be configured to facilitate a connection 1760 to the host computer 1710. The connection 1760 may be direct or it may pass through a core network (not shown in FIG. 17) of the telecommunication system and/or through one or more intermediate networks outside the telecommunication system. In the embodiment shown, the hardware 1725 of the RBS 1720 further includes processing circuitry 1728, which may comprise one or more programmable processors, application-specific integrated circuits, field programmable gate arrays or combinations of these (not shown) adapted to execute instructions. The RBS 1720 further has software 1721 stored internally or accessible via an external connection.

The communication system 1700 further includes the UE 1730 already referred to. Its hardware 1735 may include a radio interface 1737 configured to set up and maintain a wireless connection 1770 with a RBS serving a coverage area in which the UE 1730 is currently located. The hardware 1735 of the UE 1730 further includes processing circuitry 1738, which may comprise one or more programmable processors, application-specific integrated circuits, field programmable gate arrays or combinations of these (not shown) adapted to execute instructions. The UE 1730 further comprises software 1731, which is stored in or accessible by the UE 1730 and executable by the processing circuitry 1738. The software 1731 includes a client application 1732. The client application 1732 may be operable to provide a service to a human or non-human user via the UE 1730, with the support of the host computer 1710. In the host computer 1710, an executing host application 1712 may communicate with the executing client application 1732 via the OTT connection 1750 terminating at the UE 1730 and the host computer 1710. In providing the service to the user, the client application 1732 may receive request data from the host application 1712 and provide user data in response to the request data. The OTT connection 1750 may transfer both the request data and the user data. The client application 1732 may interact with the user to generate the user data that it provides.

Figure 17:
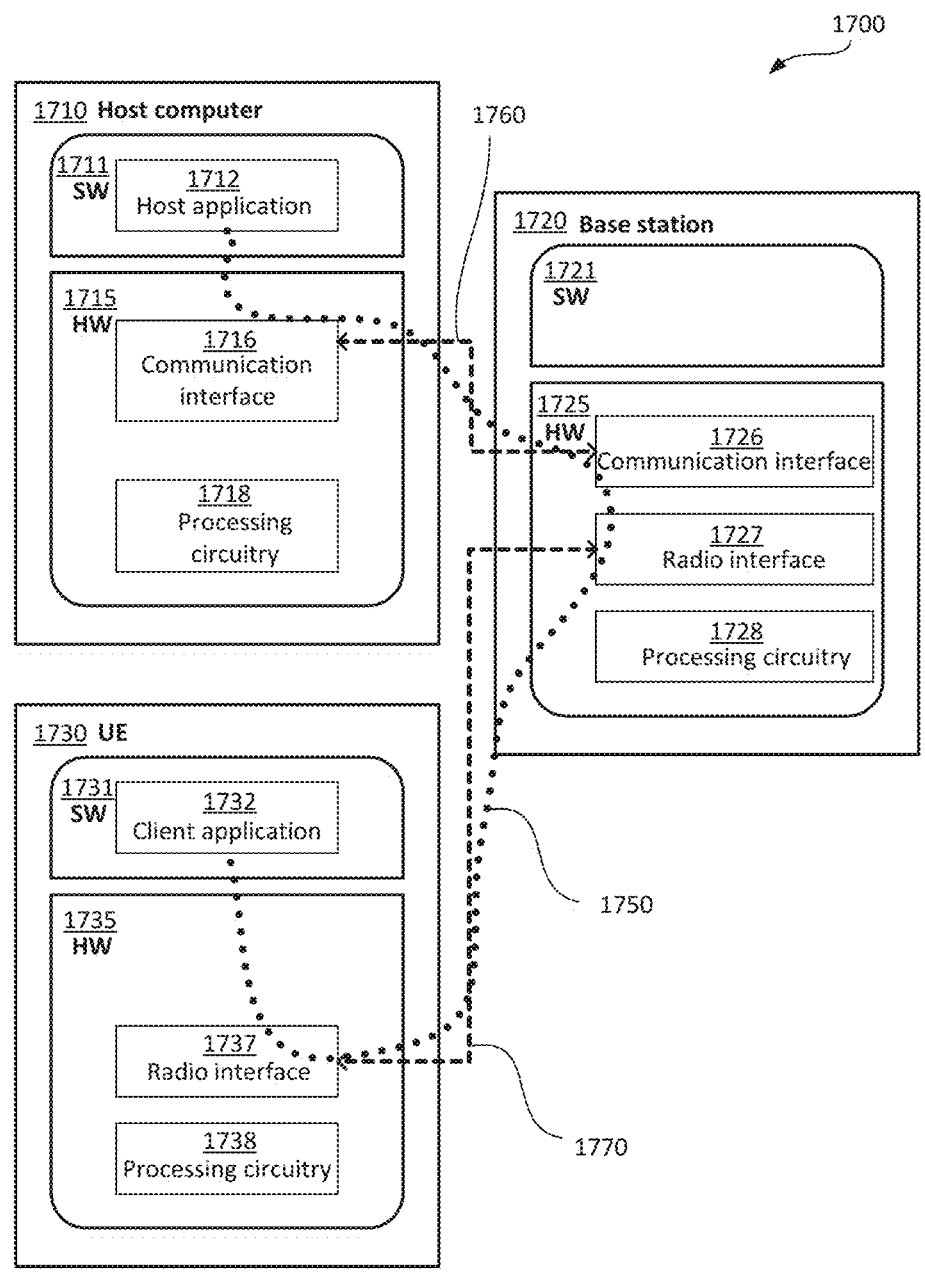
FIG. 17 shows a generalized block diagram of a host computer communicating via a radio base station with a user equipment over a partially wireless connection.

It is noted that the host computer 1710, RBS 1720 and UE 1730 illustrated in FIG. 17 may be identical to the host computer 1630, one of the RBSs 1612a, 1612b, 1612c and one of the UEs 1691, 1692 of FIG. 16, respectively. This is to say, the inner workings of these entities may be as shown in FIG. 17 and independently, the surrounding network topology may be that of FIG. 16.

In FIG. 17, the OTT connection 1750 has been drawn abstractly to illustrate the communication between the host computer 1710 and the use equipment 1730 via the RBS 1720, without explicit reference to any intermediary devices and the precise routing of messages via these devices. Network infrastructure may determine the routing, which it may be configured to hide from the UE 1730 or from the service provider operating the host computer 1710, or both. While the OTT connection 1750 is active, the network infrastructure may further take decisions by which it dynamically changes the routing (e.g., on the basis of load balancing consideration or reconfiguration of the network).

The wireless connection 1770 between the UE 1730 and the RBS 1720 is in accordance with the teachings of the embodiments described throughout this disclosure. One or more of the various embodiments improve the performance of OTT services provided to the UE 1730 using the OTT connection 1750, in which the wireless connection 1770 forms the last segment. More precisely, the teachings of these embodiments may reduce the latency and improve the data rate and thereby provide benefits such as better responsiveness.

A measurement procedure may be provided for the purpose of monitoring data rate, latency and other factors on which the one or more embodiments improve. There may further be an optional network functionality for reconfiguring the OTT connection 1750 between the host computer 1710 and UE 1730, in response to variations in the measurement results. The measurement procedure and/or the network functionality for reconfiguring the OTT connection 1750 may be implemented in the software 1711 of the host computer 1710 or in the software 1731 of the UE 1730, or both. In embodiments, sensors (not shown) may be deployed in or in association with communication devices through which the OTT connection 1750 passes; the sensors may participate in the measurement procedure by supplying values of the monitored quantities exemplified above, or supplying values of other physical quantities from which software 1711, 1731 may compute or estimate the monitored quantities. The reconfiguring of the OTT connection 1750 may include message format, retransmission settings, preferred routing etc.; the reconfiguring need not affect the RBS 1720, and it may be unknown or imperceptible to the RBS 1720. Such procedures and functionalities may be known and practiced in the art. In certain embodiments, measurements may involve proprietary UE signaling facilitating the host computer's 1710 measurements of throughput, propagation times, latency and the like. The measurements may be implemented in that the software 1711, 1731 causes messages to be transmitted, in particular empty or "dummy" messages, using the OTT connection 1750 while it monitors propagation times, errors etc.

Figures 18, 19:
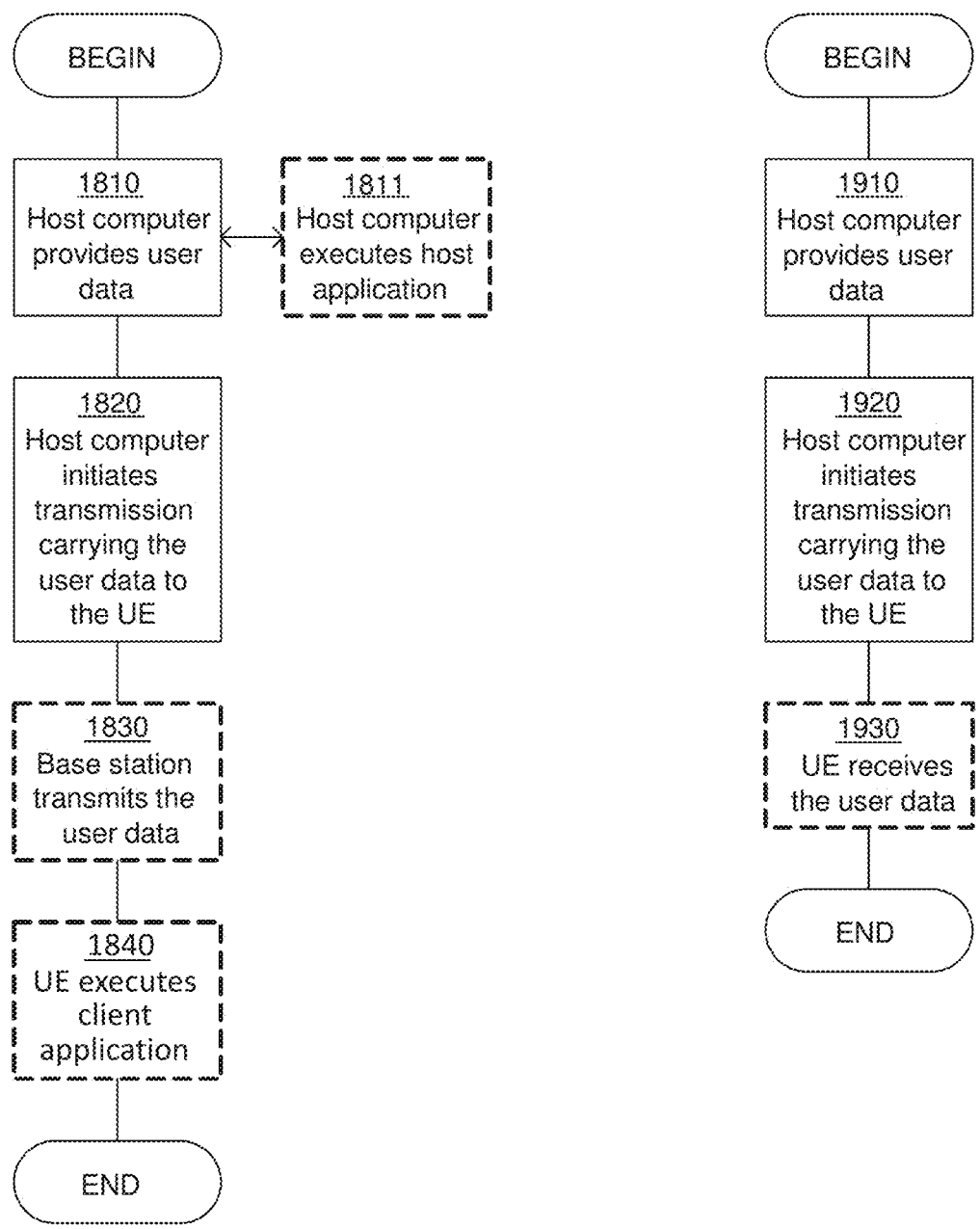
FIGS. 18 and 19 show flowcharts for methods implemented in a communication system including a host computer, a radio base station and a user equipment.

FIG. 18 is a flowchart illustrating a method implemented in a communication system, in accordance with one embodiment. The communication system includes a host computer, a RBS and a, UE which may be those described with reference to FIGS. 16 and/or 17. For simplicity of the present disclosure, only drawing references to FIG. 18 will be included in this section. In a first step 1810 of the method, the host computer provides user data. In an optional substep 1811 of the first step 1810, the host computer provides the user data by executing a host application. In a second step 1820, the host computer initiates a transmission carrying the user data to the UE. In an optional third step 1830, the RBS transmits to the UE the user data which was carried in the transmission that the host computer initiated, in accordance with the teachings of the embodiments described throughout this disclosure. In an optional fourth step 1840, the UE executes a client application associated with the host application executed by the host computer.

FIG. 19 is a flowchart illustrating a method implemented in a communication system, in accordance with one embodiment. The communication system includes a host computer, a RBS and a UE, which may be those described with reference to any one of the FIGS. 1 to 17. For simplicity of the present disclosure, only drawing references to FIG. 19 will be included in this section. In a first step 1910 of the method, the host computer provides user data. In an optional substep (not shown) the host computer provides the user data by executing a host application. In a second step 1920, the host computer initiates a transmission carrying the user data to the UE. The transmission may pass via the RBS, in accordance with the teachings of the embodiments described throughout this disclosure. In an optional third step 1930, the UE receives the user data carried in the transmission.

As has become apparent from above description, embodiments of the technique enable a UE to detect whether TSN and/or which or how particular TSN features are supported by wireless access (e.g., in a 5G network) in order to be able to set up a TSN connection for the TSN application requiring these features.

Same or further embodiments can reduce time and/or avoid a lot of signaling complexity (e.g., as compared to the time and signaling complexity that would be part of a conventional radio access, wherein the UE establishes first a connection to the network). The embodiments can broadcasting and receive this information right away before the UE is radio-connected to the RAN.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of handling Time-Sensitive Networking, TSN, over a radio access network, RAN, the method comprising:
   receiving system information from a radio base station of the RAN, wherein the system information is implicative or indicative of support for TSN through the radio base station; and
   establishing or initiating to establish, depending on the received system information, at least one TSN stream of the TSN through the radio base station.

2. The method of claim 1, wherein the step of establishing or initiating to establish, depending on the received system information, the at least one TSN stream comprises selectively establishing or selectively initiating to establish the at least one TSN stream, wherein the selectivity is dependent on the received system information.

3. The method of claim 1, wherein the step of establishing or initiating to establish the at least one TSN stream comprises selectively performing or selectively initiating to perform at least one of:
   a random access procedure with the radio base station of the RAN;
   a radio resource control, RRC, connection setup with the radio base station of the RAN; and
   a network attach procedure with a core network connected to the RAN,
   wherein the selectivity is dependent on the received system information.

4. The method of claim 1, wherein the establishing step comprises:
   performing or initiating to perform a TSN application that uses the at least one established TSN stream.

5. The method of claim 4, wherein the selectivity is fulfilled if the received system information is indicative of TSN features required by the TSN application.

6. The method of claim 4, wherein the step of receiving the system information is performed with respect to each of a plurality of radio base stations of the RAN, and wherein the step of establishing or initiating to establish the at least one TSN stream comprises selecting, among the plurality of radio base stations, the radio base station the system information of which is indicative of TSN features required by the TSN application.

7. The method of claim 4, further comprising the step of:
   sending a control message to the core network, the control message being indicative of TSN features required by the TSN application.

8. The method of claim 1, wherein the system information is implicative or indicative of at least one TSN feature supported by or through the radio base station.

9. The method of claim 8, wherein the at least one TSN feature comprises at least one of:
   a time-synchronization of components processing the at least one TSN stream of the TSN over the RAN;
   a latency bound for the at least one TSN stream of the TSN over the RAN; and
   a reliability measure for the at least one TSN stream of the TSN over the RAN.

10. The method of claim 9, wherein the system information is indicative of a TSN configuration for the TSN through the radio base station.

11. The method of claim 10, wherein the TSN configuration is indicative of an availability of at least one of a Central Networking Configuration, CNC, and a Central User Configuration, CUC.

12. The method of claim 1, wherein the system information is broadcasted from the radio base station.

13. The method of claim 1, wherein the system information is comprised in one or more system information blocks, SIBs.

14. A method of announcing Time-Sensitive Networking, TSN, over a radio access network, RAN, the method comprising:
   transmitting system information from a radio base station of the RAN, wherein the system information is implicative or indicative of support for TSN through the radio base station; and
   supporting, according to the transmitted system information, at least one TSN stream of the TSN through the radio base station.

15. The method of claim 14, further comprising:
   receiving a configuration message indicative of the support for TSN from a core network, CN, at the radio base station, wherein the transmitted system information is derived from the received configuration message.

16. The method of claim 15, wherein the system information is implicative or indicative of at least one TSN feature supported by or through the radio base station.

17. The method of claim 14, wherein the system information is broadcasted in one or more system information blocks, SIBs.

18. The method of claim 14, wherein the system information is indicative of a TSN configuration for the TSN through the radio base station.

19. A device for handling Time-Sensitive Networking, TSN, over a radio access network, RAN, the device comprising at least one processor and a memory, said memory comprising instructions executable by said at least one processor, whereby the device is operative to:
   receive system information from a radio base station of the RAN, wherein the system information is implicative or indicative of support for TSN through the radio base station; and
   establish or initiate establishing, depending on the received system information, at least one TSN stream of the TSN through the radio base station.

20. The device of claim 19, further operative to selectively establish or selectively initiate to establish the at least one TSN stream based on the received system information.

21. A device for announcing Time-Sensitive Networking, TSN, over a radio access network, RAN, the device comprising at least one processor and a memory, said memory comprising instructions executable by said at least one processor, whereby the device is operative to:
   transmit system information from a radio base station of the RAN, wherein the system information is implicative or indicative of support for TSN through the radio base station; and
   support, according to the transmitted system information, at least one TSN stream of the TSN through the radio base station.

22. The device of claim 21, further operative to receive a configuration message indicative of the support for TSN from a core network, CN, at the radio base station, wherein the transmitted system information is derived from the received configuration message.

* * * * *

UNITED STATES PATENT AND TRADEMARK OFFICE
CERTIFICATE OF CORRECTION

| | | |
|---|---|---|
| PATENT NO. | : 11,265,805 B2 | |
| APPLICATION NO. | : 16/096915 | |
| DATED | : March 1, 2022 | |
| INVENTOR(S) | : Munz et al. | |

It is certified that error appears in the above-identified patent and that said Letters Patent is hereby corrected as shown below:

On the Title Page

Item [56], under "OTHER PUBLICATIONS", in Column 2, Line 5, delete "Compoter" and insert -- Computer --, therefor.

Page 2, item [56], under "OTHER PUBLICATIONS", in Column 1, Line 5, delete "(NGP);" and insert -- (NGPs); --, therefor.

Page 2, item [56], under "OTHER PUBLICATIONS", in Column 1, Line 9, delete "3GPPTS" and insert -- 3GPP TS --, therefor.

In the Drawings

Fig. 17, Sheet 12 of 13, for Tag "1720", in Line 1, delete "Base station" and insert -- Radio base station --, therefor.

In the Specification

Column 1, Lines 29-30, delete "Time Sensitive Networking" and insert -- Time-Sensitive Networking --, therefor.

Column 3, Line 6, delete "UE," and insert -- UE. --, therefor.

Column 3, Line 45, delete "(RFU," and insert -- (RFUs, --, therefor.

Column 3, Line 46, delete "RRH)" and insert -- RRHs) --, therefor.

Column 3, Line 57, delete "may a" and insert -- may be a --, therefor.

Column 8, Line 35, delete "RBS," and insert -- RBS. --, therefor.

Signed and Sealed this
Twelfth Day of July, 2022

*Katherine Kelly Vidal*

Katherine Kelly Vidal
*Director of the United States Patent and Trademark Office*

CERTIFICATE OF CORRECTION (continued)
U.S. Pat. No. 11,265,805 B2

Column 12, Lines 8-9, delete "that in NR" and insert -- that NR --, therefor.

Column 14, Line 24, delete "CN 710" and insert -- CN 730 --, therefor.

Column 15, Line 30, delete "RAN 730" and insert -- RAN 710 --, therefor.

Column 17, Line 4, delete "CUC 300-2" and insert -- CUC 300-3 --, therefor.

Column 17, Line 37, delete "In a eleventh" and insert -- In an eleventh --, therefor.

Column 18, Line 16, delete "Integer; OPTIONAL," and insert -- Integer OPTIONAL, --, therefor.

Column 23, Line 18, delete "use equipment" and insert -- user equipment --, therefor.

Column 24, Line 5, delete "FIGS. 16 and/or 17." and insert -- FIG. 16 and/or 17. --, therefor.

Column 24, Lines 44-45, delete "broadcasting" and insert -- broadcast --, therefor.